US012812423B2

(12) United States Patent
Vijayakumar et al.

(10) Patent No.: US 12,812,423 B2
(45) Date of Patent: Nov. 24, 2026

(54) CELLULAR FIELD TESTING AUTOMATION TOOL INCLUDING NETWORK CONDITIONS MONITOR, AUDIBLE AND VISIBLE CONCLUSION ALARMS, AND DATA STALLS

(71) Applicant: Boost SubscriberCo L.L.C., Englewood, CO (US)

(72) Inventors: Nikhil Rangaraajan Vijayakumar, Littleton, CO (US); Andrew Allan, Littleton, CO (US); In-Kyung Kim, Highlands Ranch, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 313 days.

(21) Appl. No.: 18/397,781

(22) Filed: Dec. 27, 2023

(65) Prior Publication Data

US 2025/0220466 A1 Jul. 3, 2025

(51) Int. Cl.
*H04W 24/08* (2009.01)
*H04L 41/22* (2022.01)

(52) U.S. Cl.
CPC ............ *H04W 24/08* (2013.01); *H04L 41/22* (2013.01)

(58) Field of Classification Search
CPC ...... H04L 41/22; H04L 43/0888; H04L 43/50
See application file for complete search history.

(56) References Cited

U.S. PATENT DOCUMENTS 11,076,346 B2 7/2021 Chinbe et al.
11,765,789 B1 9/2023 Zheng
12,363,566 B2 7/2025 Naseef
2005/0272445 A1 12/2005 Zellner
2012/0035904 A1 2/2012 Seckendorf et al.
(Continued)

FOREIGN PATENT DOCUMENTS

CN 102595435 B 8/2015

OTHER PUBLICATIONS

Nikhil Rangaraajan Vijayakumar et al., "Cellular Field Testing Automation Tool," U.S. Appl. No. 18/228,848, filed Aug. 1, 2023. (38 Pages).

(Continued)

*Primary Examiner* — Wesley L Kim
*Assistant Examiner* — Erkin Abdullaev
(74) *Attorney, Agent, or Firm* — Kipman T. Werking; Frontier IP Law PLLC

(57) ABSTRACT

A disclosed method may include initiating a cellular field testing tool that tests, during a test case, a condition of cellular network connectivity to both a device under test and a reference device, comparing, by the cellular field testing tool, how well the device under test performs with how well the reference device performs, determining, by the cellular field testing tool, a theoretical throughput level corresponding to an expected value of a network connection between the device under test or the reference device and a cellular base station, and displaying, by the cellular field testing tool, a color-coded graphical representation of a category indicating how well the device under test or the reference device performs in comparison to the theoretical throughput level such that the displaying enables a user to detect whether a problem exists with the network connection to the device under test or the reference device.

20 Claims, 29 Drawing Sheets

(56) References Cited

U.S. PATENT DOCUMENTS

| | | | | |
|---|---|---|---|---|
| 2014/0105058 | A1* | 4/2014 | Hu | H04W 24/08 370/253 |
| 2014/0187172 | A1 | 7/2014 | Partee | |
| 2014/0280904 | A1* | 9/2014 | Bugenhagen | H04L 43/12 709/224 |
| 2015/0140956 | A1 | 5/2015 | Prewitt et al. | |
| 2015/0189525 | A1* | 7/2015 | Schmidt | H04W 24/08 455/436 |
| 2015/0264591 | A1 | 9/2015 | Baeder | |
| 2016/0227423 | A1 | 8/2016 | Bahr | |
| 2016/0277939 | A1 | 9/2016 | Bertrand et al. | |
| 2016/0373944 | A1 | 12/2016 | Jain et al. | |
| 2017/0195357 | A1 | 7/2017 | Sundhar et al. | |
| 2017/0214734 | A1 | 7/2017 | Sun | |
| 2017/0317907 | A1 | 11/2017 | Chinbe et al. | |
| 2018/0084380 | A1 | 3/2018 | Lucas | |
| 2019/0215707 | A1 | 7/2019 | Jackson | |
| 2019/0377027 | A1 | 12/2019 | Rivoir | |
| 2021/0326680 | A1 | 10/2021 | Chaaraoui et al. | |
| 2021/0385646 | A1* | 12/2021 | Liu | H04W 24/04 |
| 2022/0140919 | A1* | 5/2022 | Linkola | H04B 17/103 370/329 |
| 2023/0370874 | A1 | 11/2023 | Wu | |
| 2023/0380012 | A1* | 11/2023 | Zheng | G06F 18/254 |
| 2024/0187958 | A1 | 6/2024 | Yan et al. | |
| 2024/0361469 | A1 | 10/2024 | Dupray et al. | |

OTHER PUBLICATIONS

Nikhil Rangaraajan Vijayakumar, "Cellular Field Testing Automation Tool: Pass Fail Analysis and Test Scenario Recovery," U.S. Appl. No. 18/385,297, filed Oct. 30, 2023. (52 Pages).

Nikhil Rangaraajan Vijayakumar et al., "Cellular Field Testing Automation Tool: Automation of Emergency Location Accuracy Improvements," U.S. Appl. No. 18/540,581, filed Dec 14, 2023. (46 Pages).

Nikhil Rangaraajan Vijayakumar et al., "Cellular Field Testing Automation Tool Including Carrier Aggregation Combination Alignment," U.S. Appl. No. 18/535,795, filed Dec 11, 2023. (47 Pages).

Nikhil Rangaraajan Vijayakumar et al., "Cellular Field Testing Automation Tool: Automated Communication Channel Handover," U.S. Appl. No. 18/395,237, filed Dec. 22, 2023. (52 Pages).

* cited by examiner

CELLULAR FIELD TESTING AUTOMATION TOOL INCLUDING NETWORK CONDITIONS MONITOR, AUDIBLE AND VISIBLE CONCLUSION ALARMS, AND DATA STALLS

BRIEF SUMMARY

This disclosure is generally directed to a cellular field testing automation tool including methods and systems relating to a network conditions monitor, audible and visible conclusion alarms, and data stalls, as discussed in more detail below. In one example, a method may include (i) initiating a cellular field testing tool that tests, during a test case, a condition of cellular network connectivity to both a device under test and a reference device, (ii) comparing, by the cellular field testing tool, how well the device under test performs with how well the reference device performs, (iii) determining, by the cellular field testing tool, a theoretical throughput level corresponding to an expected value of a network connection between the device under test or the reference device and a cellular base station, and (iv) displaying, by the cellular field testing tool, a color-coded graphical representation of a category indicating how well the device under test or the reference device performs in comparison to the theoretical throughput level such that the displaying enables a user to detect whether a problem exists with the network connection to the device under test or the reference device.

In some examples, the method further comprises outputting, by the cellular field testing tool, an indication of how the device under test performs in comparison to how well the reference device performs.

In some examples, the cellular field testing tool compares how well the device under test performs with the theoretical throughput level.

In some examples, the cellular field testing tool compares how well the device under test performs with the theoretical throughput level by dividing a numerical measurement of how well the device under test performs by the theoretical throughput level as a percentage.

In some examples, the color-coded graphical representation corresponds to the category as one category within a plurality of categories and each one of the plurality of categories respectively corresponds to a different subrange within a plurality of subranges along which the percentage falls.

In some examples, the color-coded graphical representation of the category associates a first color with a higher degree of how well the device under test performs with the theoretical throughput level than a distinct color-coded graphical representation of a distinct category associated with a second color.

In some examples, the first color corresponds to green.

In some examples, the category belongs to a plurality of at least three categories and the cellular field testing tool associates the at least three categories with colors of green, yellow, and red, respectively.

In some examples, the cellular field testing tool outputs an indication that an apparent deficiency in performance by the device under test can be due to the problem existing with the network connection rather than due to the device under test itself.

In some examples, a non-transitory computer-readable medium encodes instructions that, when executed by at least one physical processor of a computing device, cause the computing device to perform operations comprising: (i) initiating a cellular field testing tool that tests, during a test case, a condition of cellular network connectivity to both a device under test and a reference device, (ii) comparing, by the cellular field testing tool, how well the device under test performs with how well the reference device performs, (iii) determining, by the cellular field testing tool, a theoretical throughput level corresponding to an expected value of a network connection between the device under test or the reference device and a cellular base station, and (iv) displaying, by the cellular field testing tool, a color-coded graphical representation of a category indicating how well the device under test or the reference device performs in comparison to the theoretical throughput level such that the displaying enables a user to detect whether a problem exists with the network connection to the device under test or the reference device.

In another example, a method includes (i) initiating a cellular field testing tool that tests a condition of cellular network connectivity of a device under test, (ii) detecting, by the cellular field testing tool, that a network interruption has occurred for a specified period of time, (iii) determining, by the cellular field testing tool, a proportion, during which the network interruption occurred, of an entire data session conducted as a performance test, and (iv) outputting, by the cellular field testing tool, an indication of the proportion of the entire data session during which the network interruption occurred such that a user is enabled to track how reliable a data connection is during a performance test of the device under test.

In some examples, the specified period of time corresponds to a number of seconds less than 10.

In some examples, the specified period of time is specified as a number of seconds less than 10.

In some examples, detecting that the network interruption has occurred for the specified period of time comprises detecting no downlink data and detecting no uplink data for the specified period of time.

In some examples, detecting no downlink data and detecting no uplink data comprises detecting a failure to reach a network performance tool executing at a server.

In some examples, the network performance tool comprises iPerf.

In some examples, detecting no downlink data and detecting no uplink data comprises detecting a failure to reach a network reachability tool executing at a server.

In some examples, the network reachability tool comprises ping.

In some examples, the cellular field testing tool classifies an output of a performance test as a data drop based on detecting no downlink data and no uplink data between the device under test and a network destination for a specified period of time.

In some examples, a non-transitory computer-readable medium encodes instructions that, when executed by at least one physical processor of a computing device, cause the computing device to perform operations comprising: (i) initiating a cellular field testing tool that tests a condition of cellular network connectivity of a device under test, (ii) detecting, by the cellular field testing tool, that a network interruption has occurred for a specified period of time, (iii) determining, by the cellular field testing tool, a proportion, during which the network interruption occurred, of an entire data session conducted as a performance test, and (iv) outputting, by the cellular field testing tool, an indication of the proportion of the entire data session during which the network interruption occurred such that a user is enabled to track how reliable a data connection is during a performance test of the device under test.

BRIEF DESCRIPTION OF THE DRAWINGS

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1A:
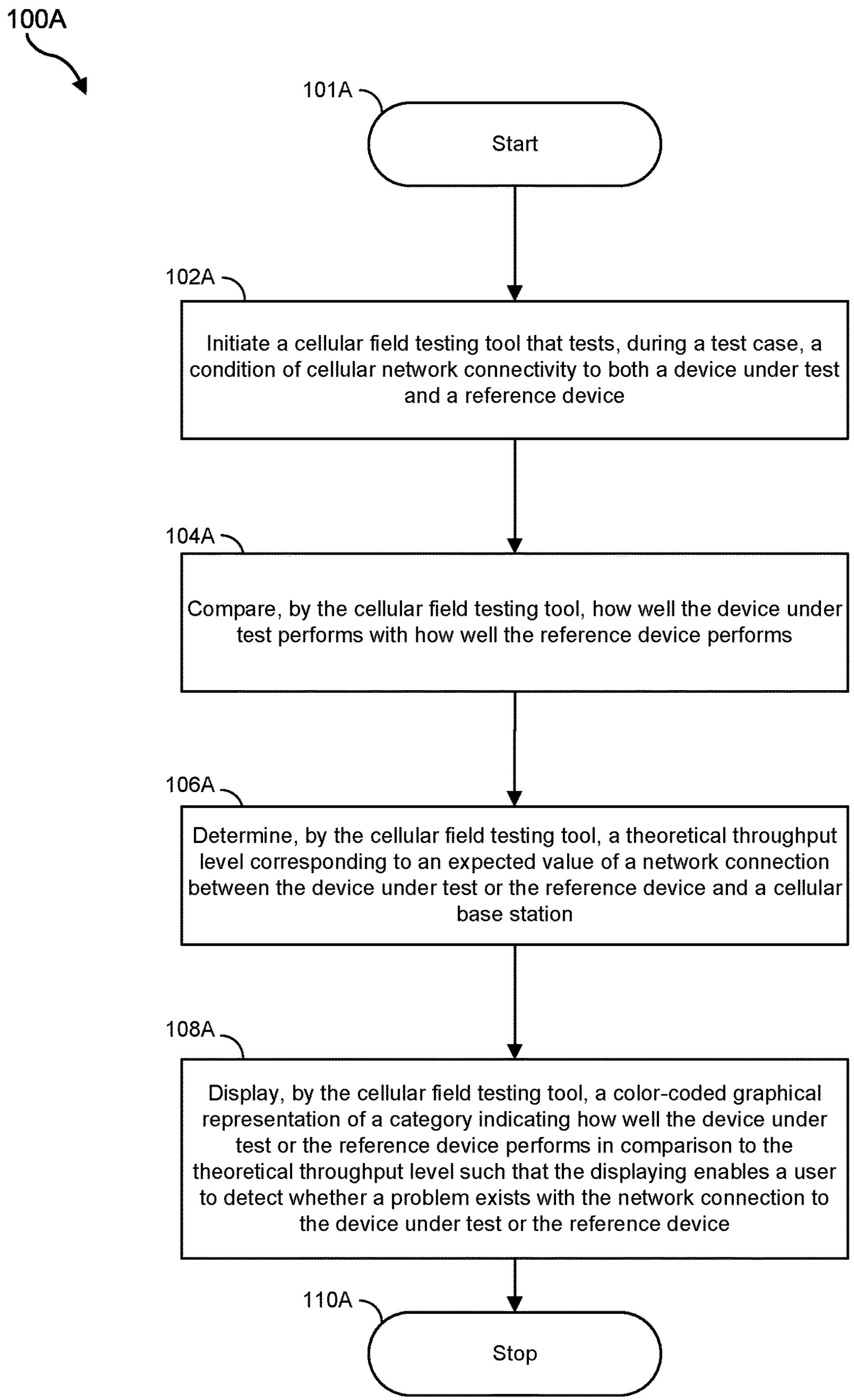
FIG. 1A shows a flow diagram for a method relating to a cellular field testing automation tool and a network conditions monitor.

FIG. 1A shows a flow diagram for an example method 100A relating to a network conditions monitor. As shown, method 100A may begin at step 101A. At step 102A, method 100A may include initiating a cellular field testing tool that tests, during a test case, a condition of cellular network connectivity to both a device under test and a reference device. At step 104A, method 100A may include comparing, by the cellular field testing tool, how well the device under test performs with how well the reference device performs. At step 106A, method 100A may include determining, by the cellular field testing tool, a theoretical throughput level corresponding to an expected value of a network connection between the device under test or the reference device and a cellular base station. As step 108A, method 100A may include displaying, by the cellular field testing tool, a color-coded graphical representation of a category indicating how well the device under test or the reference device performs in comparison to the theoretical throughput level such that the displaying enables a user to detect whether a problem exists with the network connection to the device under test or the reference device. At step 110A, method 100A may conclude.

Figure 1B:
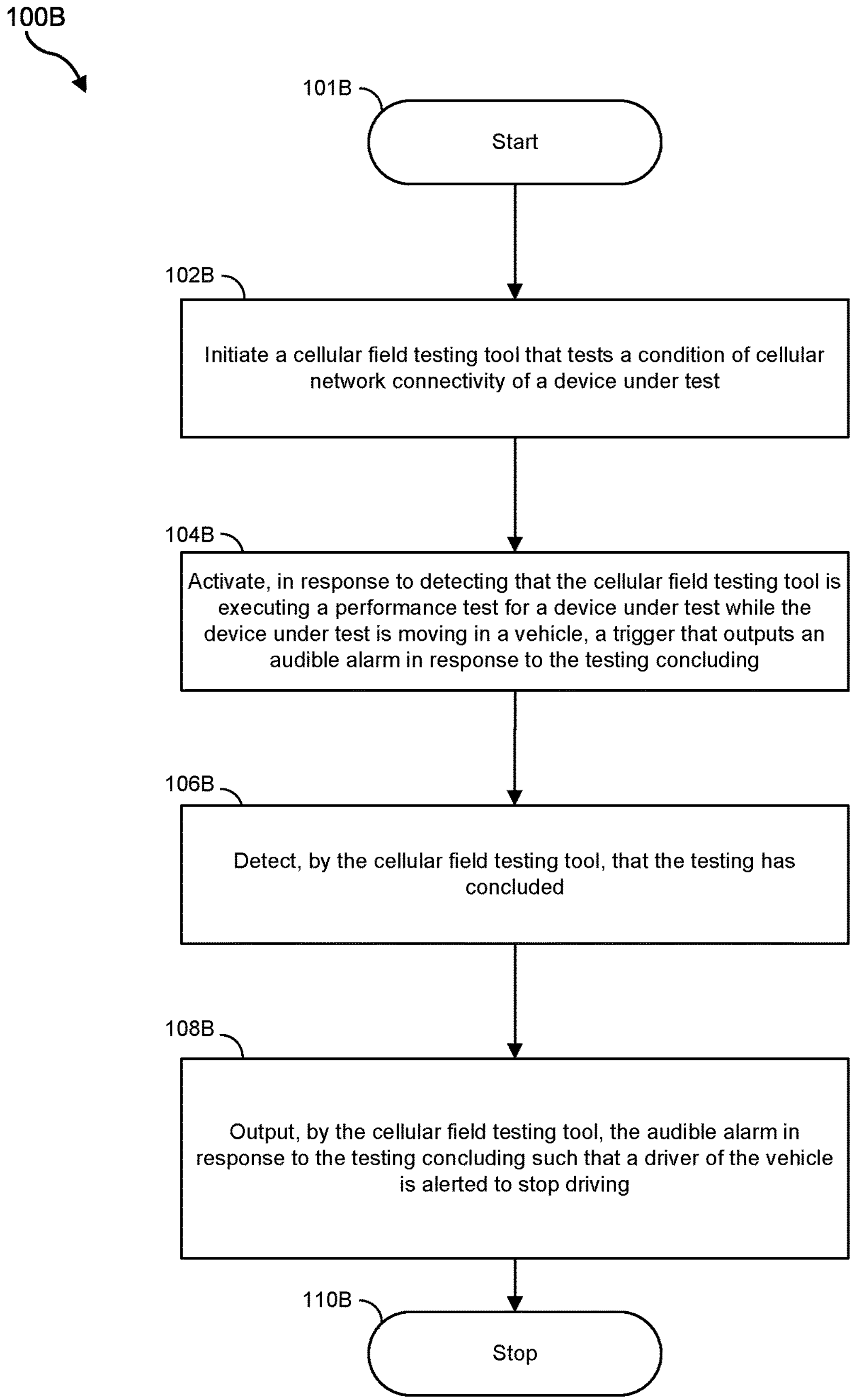
FIG. 1B shows a flow diagram for a method relating to a cellular field testing automation tool and data stalls.

FIG. 1B shows a flow diagram for an example method 100B relating to audible and visible conclusion alarms. As shown, method 100B may begin at a step 101B. At step 102B, method 100B may include initiating a cellular field testing tool that tests a condition of cellular network connectivity of a device under test. At step 104B, method 100B may include activating, in response to detecting that the cellular field testing tool is executing a performance test for a device under test while the device under test is moving in a vehicle, a trigger that outputs an audible alarm in response to the testing concluding. At step 106B, method 100B may include detecting, by the cellular field testing tool, that the testing has concluded. At step 108B, method 100B may include outputting, by the cellular field testing tool, the audible alarm in response to the testing concluding such that a driver of the vehicle is alerted to stop driving. At step 110B, method 100B may conclude.

Figure 1C:
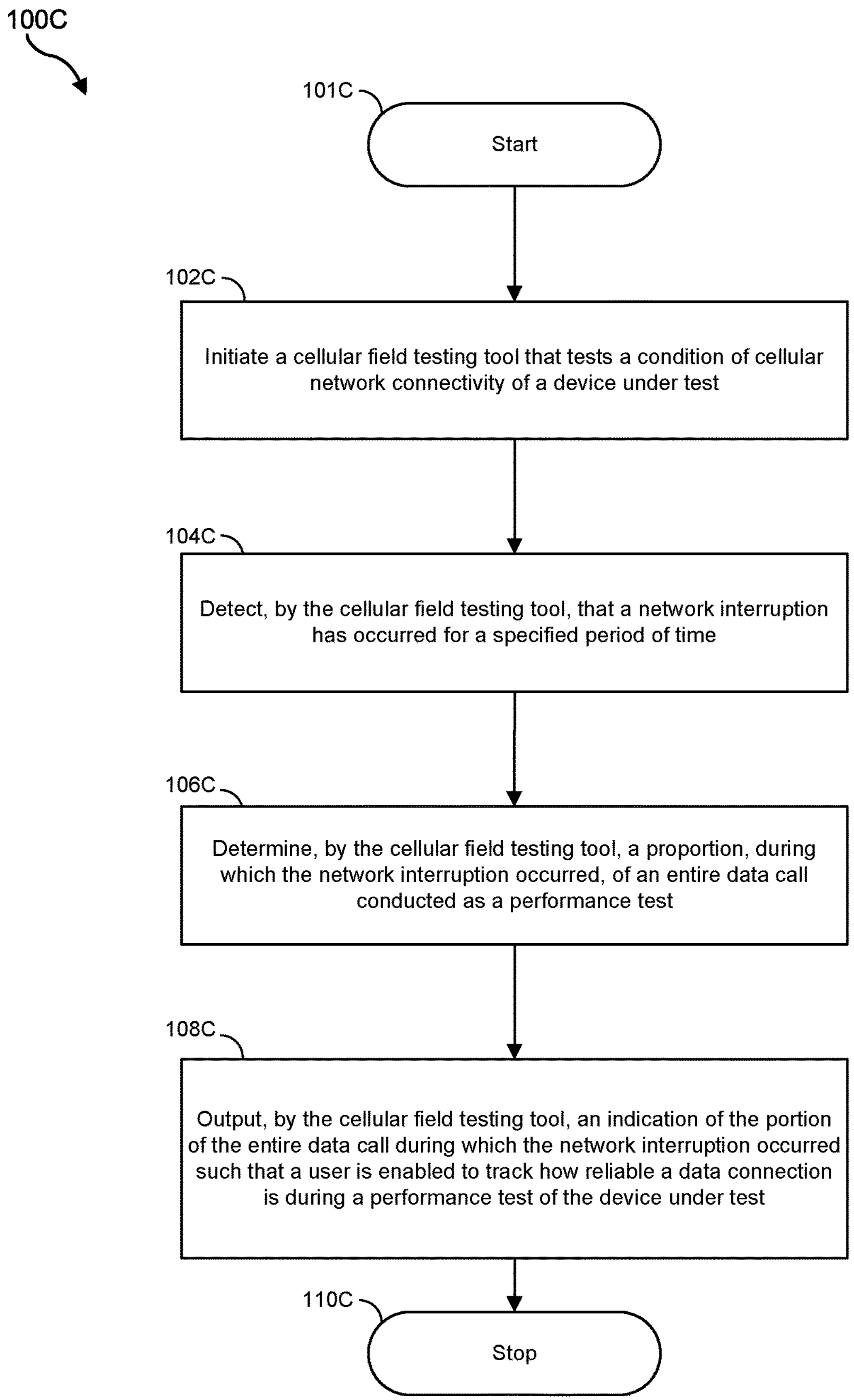
FIG. 1C shows a flow diagram for a method relating to a cellular field testing automation tool and audible and visible conclusion alarms.

FIG. 1C shows a flow diagram for an example method 100C relating to data stalls. As shown, method 100C may begin at step 101C. At step 102C, method 100C may include initiating a cellular field testing tool that tests a condition of cellular network connectivity of a device under test. At step 104C, method 100C may include detecting, by the cellular field testing tool, that a network interruption has occurred for a specified period of time. At step 106C, method 100C may include determining, by the cellular field testing tool, a portion, during which the network interruption occurred, of an entire data session conducted as a performance test. At step 108C, method 100C may include outputting, by the cellular field testing tool, an indication of the proportion of the entire data session during which the network interruption occurred such that a user is enabled to track how reliable a data connection is during a performance test of the device under test. At step 110C, method 100C may conclude.

As used herein, the term "cellular field testing tool" generally refers to a tool that helps to test, when a device under test is connected to a cellular base station and/or a cellular network, one or more attributes of performance and/or cellular network connectivity provided to the device under test. In other words, the cellular field testing tool generally tests how well the device under test performs (or how well the network performs) when connected, and configured, in accordance with a particular configuration at a particular location. Cellular network carriers may be requested to, or required to, satisfy one or more specifications when smartphones and/or other items of user equipment are connected to cellular networks. To help ensure that the cellular network carriers satisfy these particular specifications, the cellular field testing tool can be used to connect to a device under test and then check or verify that the device under test is actually achieving cellular network connectivity that satisfies one or more corresponding performance metrics, which may include dozens or even hundreds of such performance metrics. In some examples, a cellular field testing tool may correspond to (or include) a radio frequency drive testing tool, as that term is used by those having skill in the art.

Despite the above, some cellular field testing tools can suffer from one or more deficiencies or sub-optimizations and these tools may, therefore, benefit from one or more improvements, including improvements that automate one or more procedures that assist a user with operating the tool. These improved cellular field testing tools can, therefore, enable employees, contractors, and/or administrators of the cellular network carriers to appropriately operate these tools even if the administrators lack a degree of experience, sophistication, and/or detailed education regarding the performance and operation of the tools. In other words, automated improvements for the cellular field testing tools can enable less sophisticated operators to operate the tools in a more streamlined and/or user-friendly manner. Consequently, these improvements can furthermore reduce a burden on the carriers of training and/or educating these operators, while further increasing a potential pool of candidate operators for carrying out these testing procedures, as discussed in more detail below.

Similarly, as used herein, the term "precondition" can generally refer to one or more conditions that must be satisfied prior to the starting of a specific and corresponding cellular field testing tool test. Generally speaking, these preconditions refer to contextual preconditions that help to establish that the cellular field testing tool, when operating, will perform successfully and obtain results that are valid and useful (see the discussion of FIG. 3 below). Accordingly, the term "precondition," as used herein, generally does not refer to universal software preconditions that would generally apply even outside of the context of cellular field testing tools. For example, the term "precondition," as used herein, will generally not refer to a requirement to powering on the computing device executing the cellular field testing tool, in view of the fact that such a precondition would generally apply to all software even outside of the context of cellular field testing tools.

As used herein, the term "set" can generally refer to a collection of at least one precondition, unless indicated otherwise. Generally speaking, such cellular testing tools may benefit from checking or verifying a larger multitude of preconditions, as discussed in more detail below.

Figure 2:
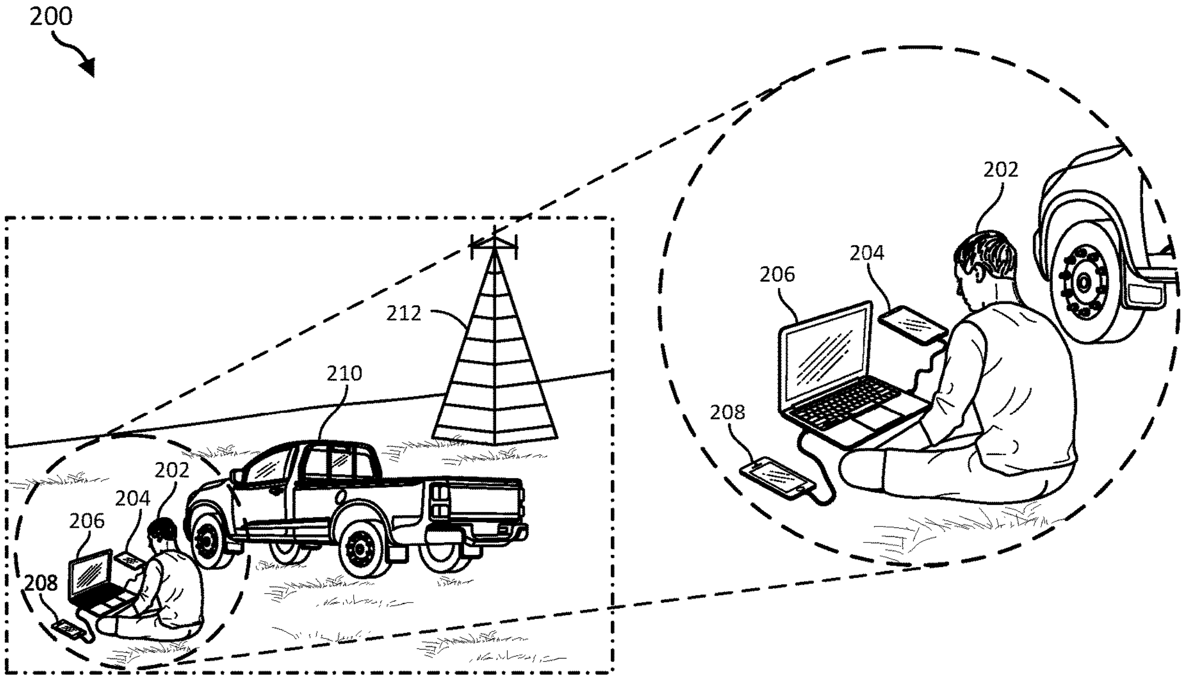
FIG. 2 shows a user operating a cellular field testing automation tool.

FIG. 2 shows an illustrative diagram 200 that helps to establish a context in which the methods described herein may be performed. As further shown in this diagram, a user or operator 202 may execute a cellular field testing tool on an item of user equipment or a computing device, such as a laptop 206. At the same time, the user may connect to additional computing devices and/or items of user equipment, such as a smartphone 204 and/or smartphone 208. In some examples, smartphone 204 may correspond to a device under test, where a smartphone 208 may correspond to a reference device (e.g., a device that may have been previously tested and/or verified as operating within specifications), or vice versa. For completeness, diagram 200 also illustrates how user 202 may have driven a truck 210 to a remote area at a particular location, where the user may establish cellular network connectivity with a cellular base station 212.

Figure 3:
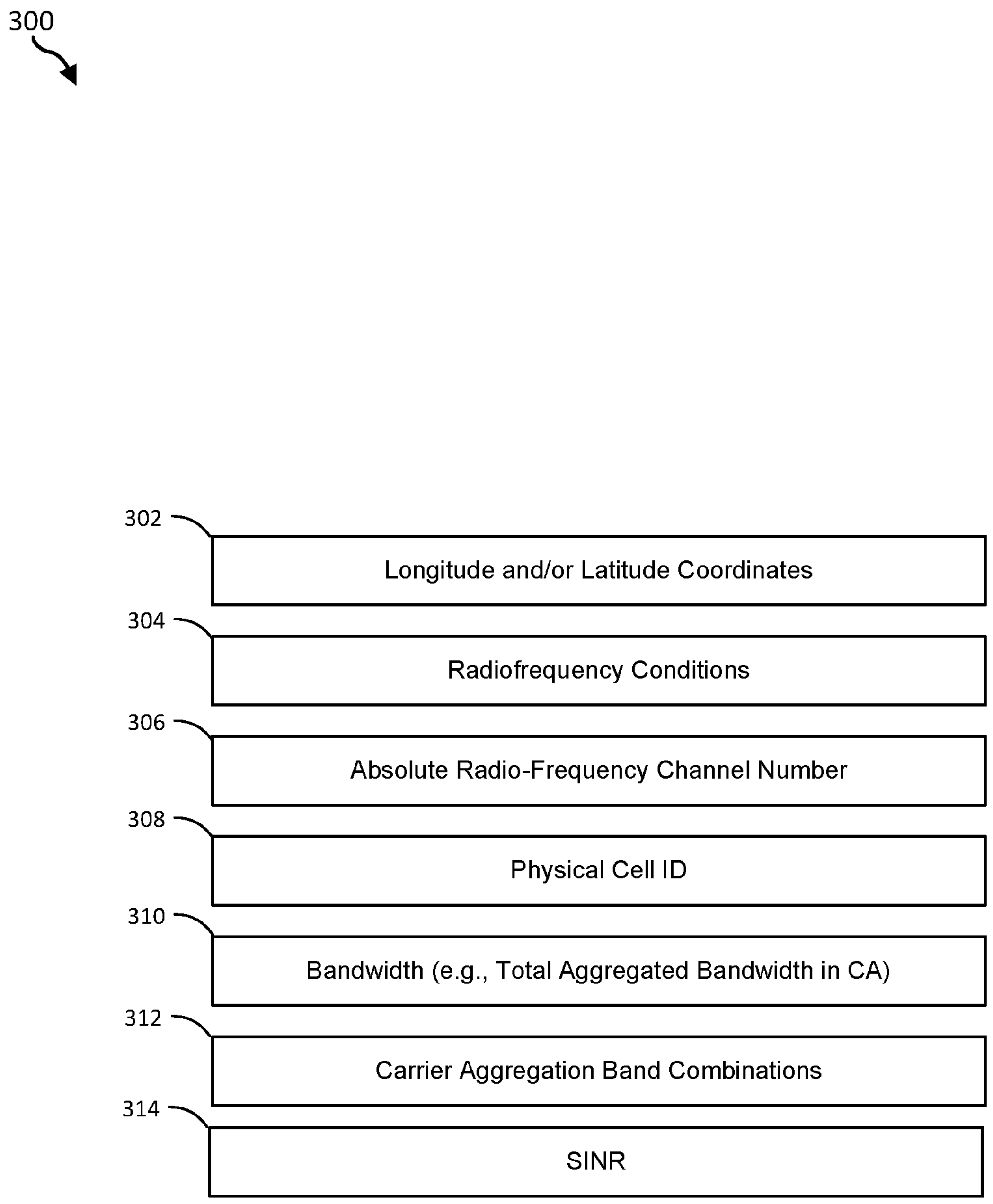
FIG. 3 shows example preconditions that can be checked prior to enabling a user to operate the cellular field testing automation tool.

FIG. 3 shows a helpful list 300 of illustrative examples of preconditions that can be checked. Precondition 302 includes longitude and/or latitude coordinates. For example, this may involve verifying that the device under test and/or the reference device (which can generally be co-located as shown in FIG. 2) are sufficiently close to, or located within, particular geolocation coordinates or perimeters. Precondition 304 includes radiofrequency conditions. Illustrative examples of such aerial frequency conditions may include one or more of the following values or measurements: Reference Signal Received Power (RSRP), Reference Signal Received Quality (RSRQ), and/or Signal to Interference plus Noise Ratio (SINR). Other illustrative examples of radio frequency conditions, which may be more or less applicable or relevant, in various embodiments, than those listed above, may further include Received Signal Strength Indicator (RSSI), Signal to Noise plus Interference Ratio (SNIR), Signal to Noise Ratio (SNR), Arbitrary Strength Unit (ASU), and/or Signal to Noise Ratio (RS SINR or RSSNR).

Returning to FIG. 3, precondition 306 may include an Absolute Radio-Frequency Channel Number (ARFCN). This particular value may refer to a unique number given to each radio channel in a Global System for Mobile Communications (GSM) cellular network. Precondition 308 may refer to a physical cell ID. As illustrated in FIG. 2, the device under test and/or the reference device may be connected to a computing device, such as a laptop, that executes the cellular field testing tool. These connections may be wired or wireless, and wired connections may be formatted to conform with the PCI protocol, USB protocol, BlueTooth, etc. Helping to ensure proper connections to the computing device that is executing the cellular field testing tool helps to ensure that, when the tool executes a specific test, the corresponding connection with the device under test and/or reference device is appropriately established to successfully interface with the logging tool to collect upload and download packets sent and received from the device under test and/or the reference device. Precondition 310 may refer to the total, aggregated bandwidth of both the device under test and the reference device, if carrier aggregation (CA) is applicable, to ensure that the device under test and the reference device are conducted under the same network conditions. Lastly, precondition 312 can refer to carrier aggregation cell combinations. As understood by those having skill in the art, some cellular network carriers can aggregate portions of spectrum and/or their cellular networks (e.g., for roaming purposes, etc.). Precondition 312 may help to check and verify that both the device under test and the reference device have the same band configurations aggregated prior to the beginning of performing one or more specific tests by the cellular field testing tool. Precondition 314 can refer to Signal to Interference and Noise Ratio (SINR).

Figure 4:
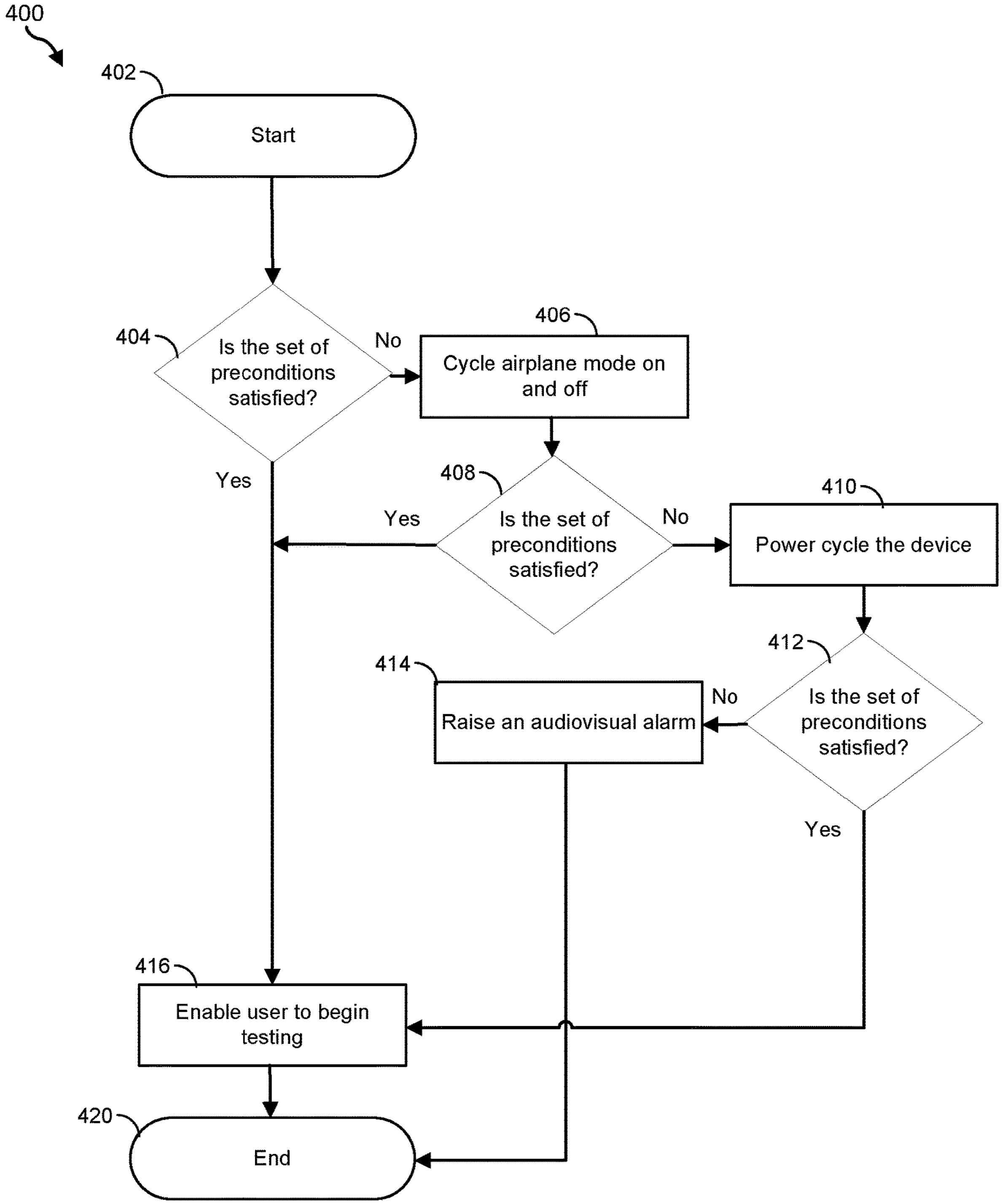
FIG. 4 shows another flow diagram for a method performed by a cellular field testing automation tool.

FIG. 4 shows a flow diagram for an example method 400 relating to operation of the cellular field testing tool. Method 400 helps to illustrate how, when checking for whether preconditions are satisfied, embodiments described herein may perform a series of different remedial actions in response to detecting that the preconditions are actually not satisfied. In some examples, the series of remedial actions may be increasingly staggered in terms of seriousness or severity, as discussed further below. The example of method 400 includes a series of three separate and staggered remedial actions (see step 406, step 410, and step 414). Although this example focuses on a set of three remedial actions, any suitable number or arbitrary number of remedial actions may be performed, in a parallel manner, as understood by those having skill in the art, with the goal of eventually achieving the successful satisfaction of all the preconditions. Moreover, although this example focuses on checking the exact same set of preconditions at each stage of the staggered process, in other examples the exact number or identity of the members of the set of preconditions may vary, slightly or more than slightly, between the different stages of the staggered process.

At step 402, method 400 may begin. At decision step 404, method 400 may perform a first check of whether the set of preconditions is satisfied. If the answer is yes at decision step 404, then method 400 may proceed to step 416, at which point method 400 may enable the user to begin a specific test, as discussed in more detail below. Alternatively, if the answer is no at decision step 404, then method 400 may proceed to step 406, at which point method 400 may cycle airplane mode on and off the specific device that is failing the preconditions (e.g., the device under test and/or the reference device).

From step 406, method 400 may proceed to decision step 408, which may correspond to the second stage of a staggered series of stages of testing whether the overall set of preconditions has been satisfied. In particular, at decision step 408, method 400 may check for the second time whether the set of preconditions has been satisfied. If the answer is no at decision step 408, then method 400 may proceed to step 410, at which point method 400 may power cycle the device that is failing the preconditions. Alternatively, again, if the answer is yes at decision step 408, then method 400 may proceed to step 416, at which point method 400 may enable the user to begin a specific test.

Lastly, as a third stage of method 400, at decision step 412, method 400 may again check whether the set of preconditions has been satisfied. If the answer is yes at decision step 412, then method 400 may proceed to step 416 again, at which point method 400 may enable the user to begin a specific test. Alternatively, if the answer is no at decision step 412, then method 400 may proceed to step 414, at which point method 400 may raise an audio and/or visual alarm to the user (see also the discussion of FIG. 14 below). At step 420, method 400 may conclude.

Figure 5:
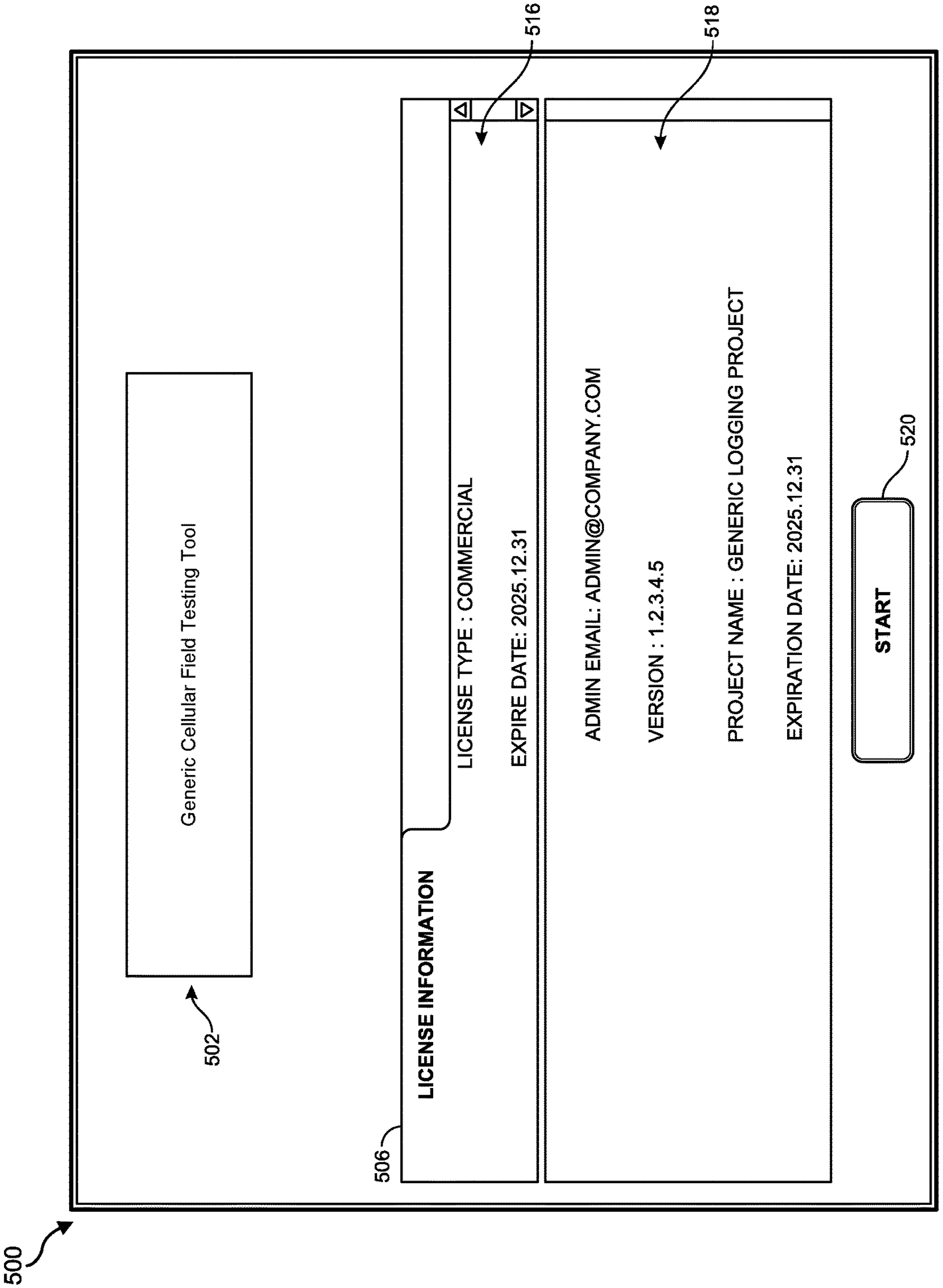
FIG. 5 shows an example introductory screen of a graphical user interface of the cellular field testing automation tool.

FIG. 5 shows a diagram 500 for an introductory screen of a graphical user interface for a cellular field testing tool that can be operated in accordance with method 400. As further shown in diagram 500, this introductory screen may include a headline 502 that indicates the name of the particular cellular field testing tool and/or software development company providing such a tool. In the simplified example of this figure, headline 502 indicates a generic name of "Generic Cellular Field Testing Tool." A graphical user interface element 506 may indicate license information. A window 516 may further provide information about the corresponding license, including its type and/or expiration date. Below that, a window 518 may further provide information about contacting a corresponding cellular network carrier ("company") that may be licensing and/or operating the corresponding software, as well as indications of a version of the software, a project name, and/or an expiration date of the license.

Figure 6:
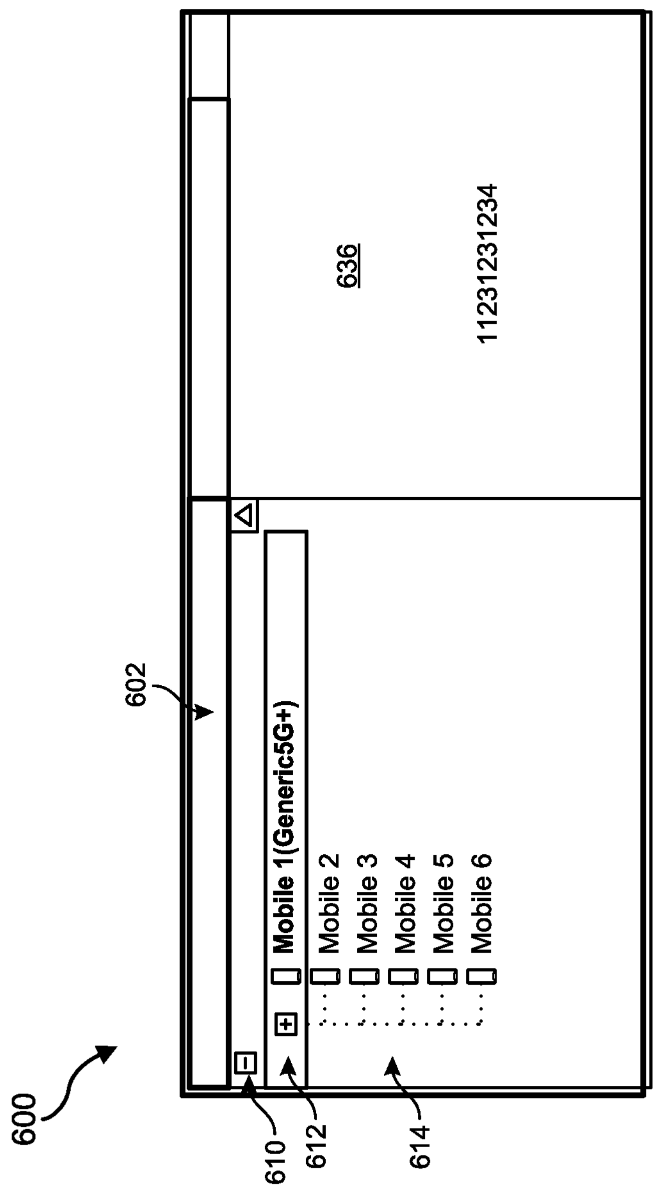
FIG. 6 shows an example screen of the graphical user interface of the cellular field testing automation tool.

FIG. 6 shows a diagram 600 of a screen of the same graphical user interface that may be presented as a result of selecting a button 520 (see FIG. 5) for starting execution of the corresponding cellular field testing tool. As further shown in diagram 600, the graphical user interface may include a devices list 602, and a drop-down menu 610 may indicate a list of mobile devices for testing. A graphical user interface element 612 may indicate the selection or connection of a specific mobile device ("Generic5G+" in this example). Moreover, a graphical user interface element 614 may further indicate a list of other candidate devices that may be selected or configured for testing. As further shown in this diagram, a portion 636 of diagram 600 indicates that the tool has connected to a particular phone number of the same mobile device corresponding to graphical user interface element 612.

Figure 7:
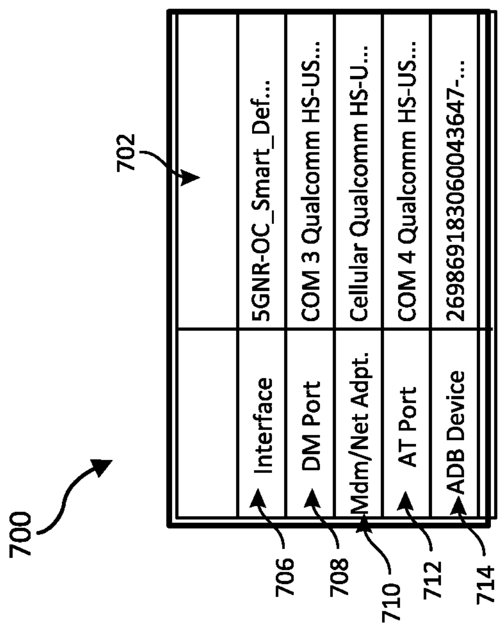
FIG. 7 shows an example screen of the graphical user interface of the cellular field testing automation tool.

FIG. 7 shows a diagram 700 of another screen of the same graphical user interface after the mobile device has been connected to initiate one or more specific tests. At this stage of operating the cellular field testing tool, the user or operator may toggle or configure one or more fields with values to set up specific testing procedures for each mobile device. Diagram 700 shows a portion 702 which corresponds to a connected mobile device of FIG. 6. A set of graphical user interface elements 706-714 show respective attributes or fields that the operator can toggle or configure to set up further testing procedures. In particular, as shown in this figure, the operator can configure, for each connected mobile device, an interface, a DM port (diagnostics and monitoring port), an MDM (Mobile Device Management) net adapter value, an AT port, and/or an Android Debug Bridge device value. In various examples, one or more of these values may be required to be configured to proceed with specific testing procedures. These examples of parameters that can be configured prior to beginning specific testing procedures are merely illustrative and, in other examples, additional or alternative parameters may be configured as appropriate.

Figure 8:
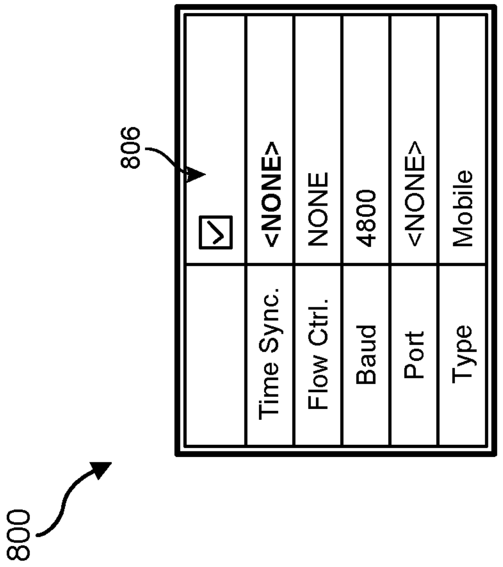
FIG. 8 shows an example screen of the graphical user interface of the cellular field testing automation tool.

FIG. 8 shows a diagram 800 that elaborates on a different aspect of the graphical user interface that was further shown as diagram 700. In particular, the corresponding diagram further illustrates how, prior to beginning specific testing procedures, the operator of the cellular field testing tool may toggle a Global Positioning System (GPS) field 806 to enable GPS functionality on one or more specific mobile devices that are under test.

Figure 9:
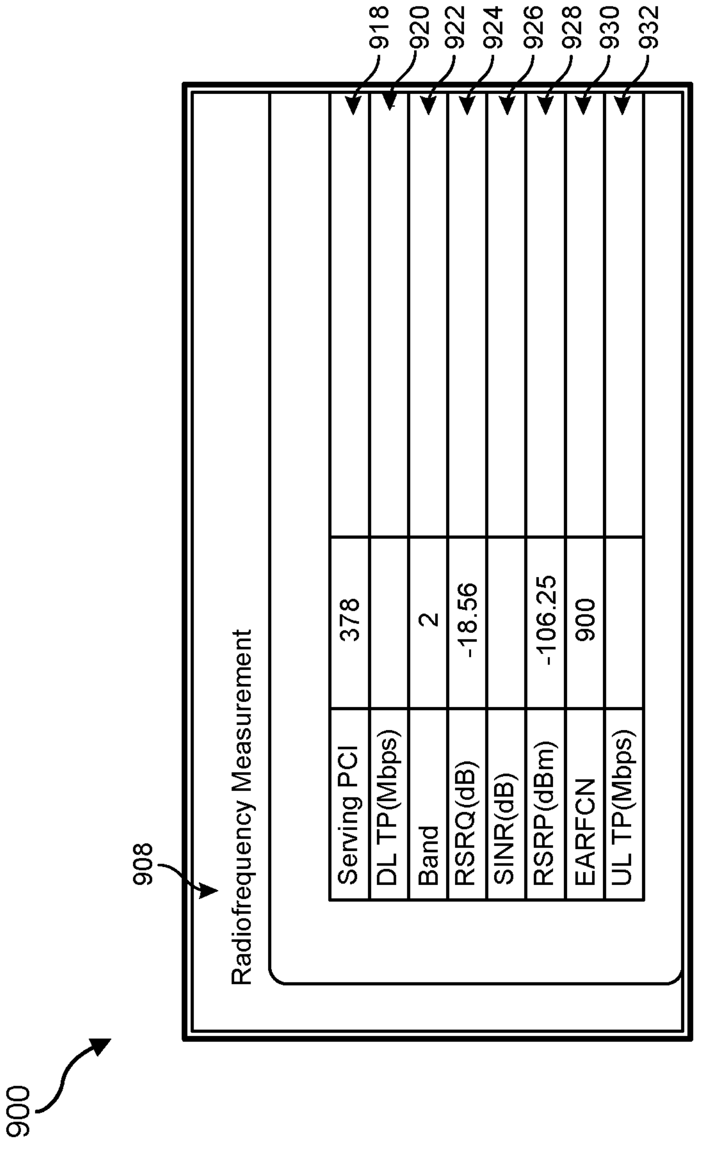
FIG. 9 shows an example screen of the graphical user interface of the cellular field testing automation tool.

FIG. 9 shows a diagram 900 of another screen of the graphical user interface of the cellular field testing tool. As further shown in this diagram, the graphical user interface can indicate to the operator one or more radiofrequency measurements and corresponding network connection attributes. A headline 908 may indicate "Radiofrequency Measurement." Rows 918-932 of diagram 900 may list respective measurement values relating to radiofrequency connectivity.

Figure 10:
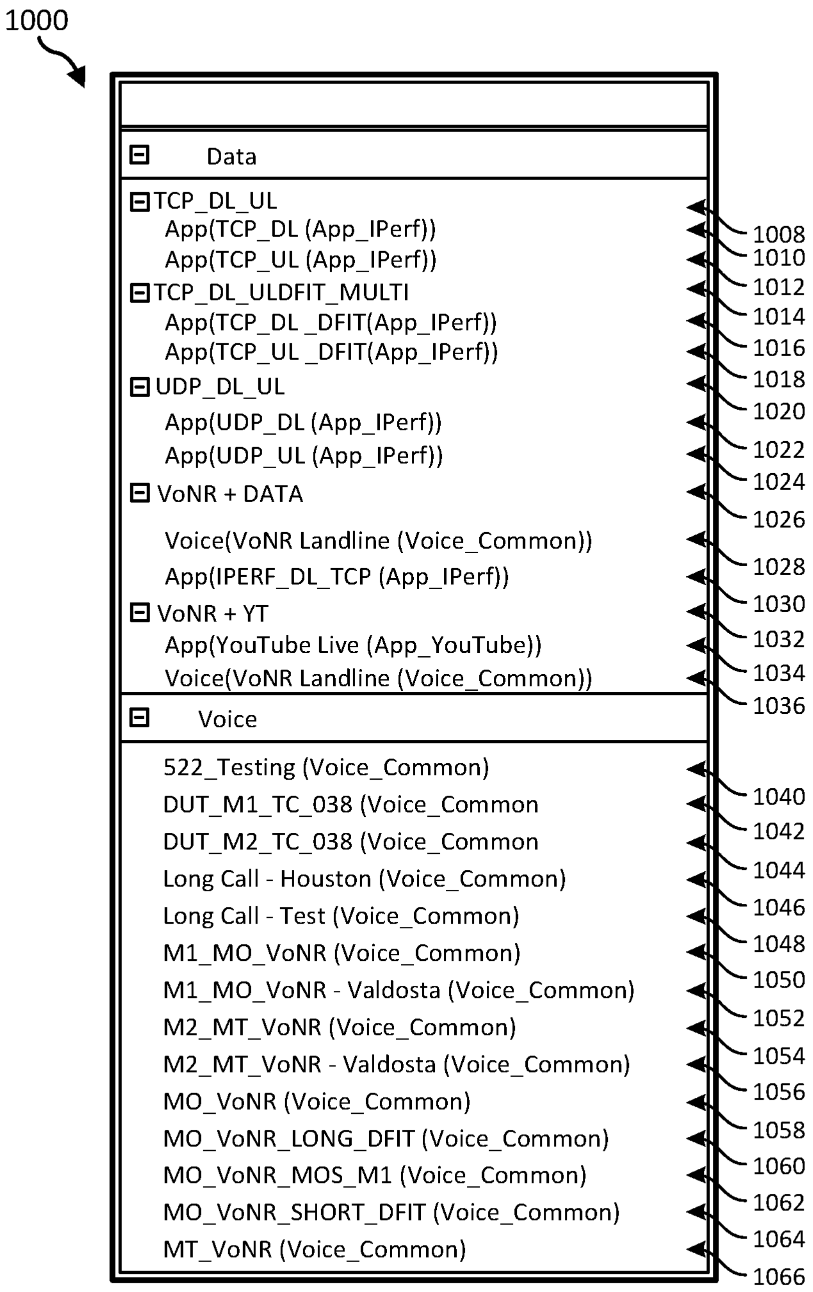
FIG. 10 shows an example screen of the graphical user interface of the cellular field testing automation tool.

FIG. 10 shows a diagram 1000 of another screen of the graphical user interface of the cellular field testing tool. As further shown in this figure, rows 1008-1066 may specify the names of different respective tests that the cellular field testing tool can perform, which can be user-customized, and these various specific tests may be categorized as either various different tests for testing data connections (see rows 1008-1036) and/or various different tests for testing voice connections (see rows 1040-1066).

Figure 11:
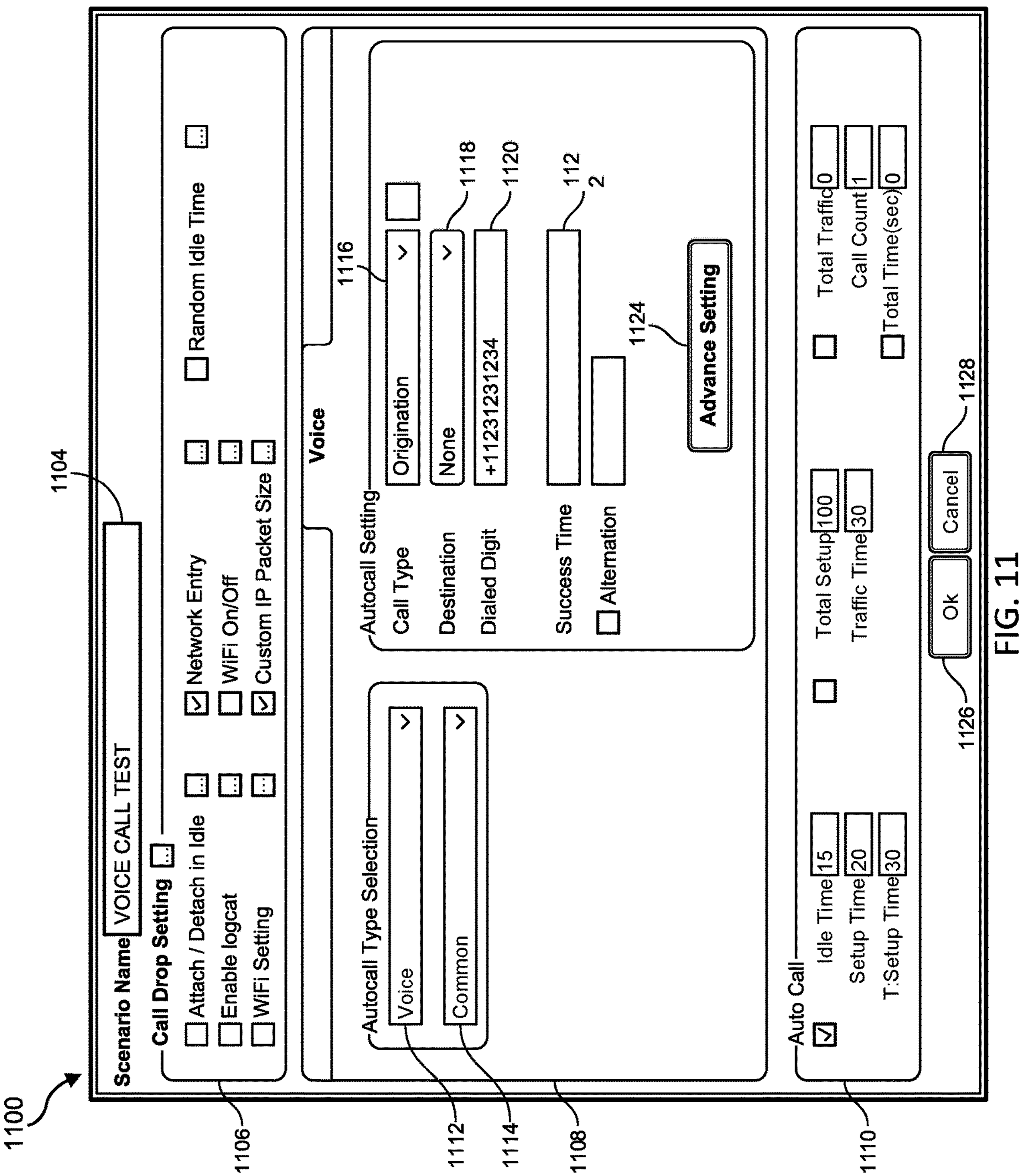
FIG. 11 shows an example screen of the graphical user interface of the cellular field testing automation tool.

FIG. 11 shows a diagram 1100 of another screen of the graphical user interface of the cellular field testing tool. As shown in this figure, diagram 1100 may include a scenario name 1104, as well as a panel 1106 of various fields or options that the operator can configure when setting up this particular test ("VOICE CALL TEST"). Another panel 1108 may further include a similar but distinct set of various fields or options that the operator can configure appropriately. Lastly, another panel 1114 may enable the user to further specify various values for another set of corresponding parameters as part of the configuration before initiating or executing the specific testing procedure. A button 1128 may enable the operator to cancel the current set of configuration procedures, and a button 1126 may enable the user to finalize configuration settings and proceed to the next stage of specific testing procedures.

Figure 12:
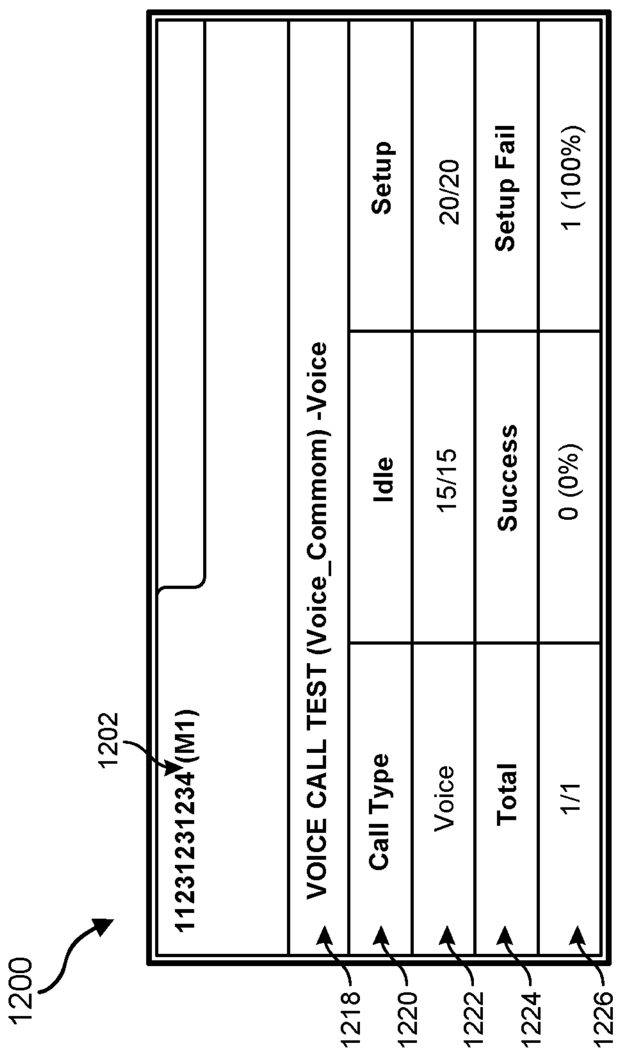
FIG. 12 shows an example screen of the graphical user interface of the cellular field testing automation tool.

FIG. 12 shows a diagram 1200 of another screen of the graphical user interface of the cellular field testing tool. An indicator 1202 may identify the phone number for the corresponding device under test. Generally speaking, the data displayed within the lower body of the window of diagram 1200 may display results, in real time, as one or more specific tests of the cellular field testing tool are being executed. In particular, a row 1220 and another respective row 1224 may display identifiers, within respective columns, to identify the type of resulting output information displayed in the rows that are immediately beneath these identifying rows. Thus, as further shown within diagram 1200, row 1222 may display values corresponding to the identifiers shown within row 1220, and row 1226 may display values corresponding to the identifier shown within row 1224. By way of illustrative example, row 1222 indicates that the call type (as indicated by row 1220) is "voice" within the same respective column.

Figure 13:
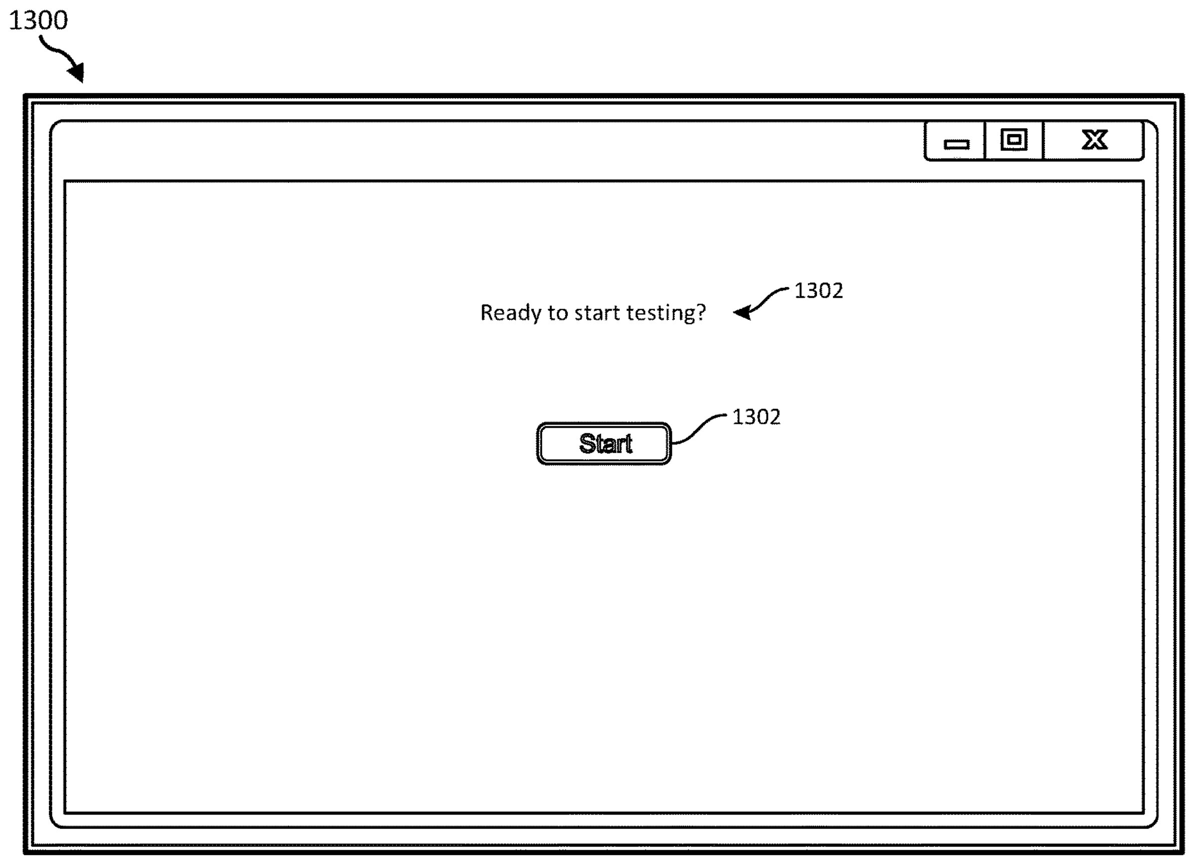
FIG. 13 shows an example screen of the graphical user interface of the cellular field testing automation tool.

FIG. 13 shows a diagram 1300 of a graphical user interface of the same cellular field testing tool that enables, or disables, the option for the operator to begin a specific test, including the specific tests that are identified or listed above by way of illustrative example. A prompt 1302 may inquire of the user whether the user is ready to begin testing procedures, after any one or more of the configuration and setup procedures that are outlined above have been performed, consistent with the discussion of FIGS. 5-12, for example. Graphical user interface element 1302, when this element is enabled, may allow the user to toggle the element and thereby finally begin specific testing procedures in accordance with the previous configuration and setup.

Nevertheless, as previously discussed above in connection with method 400, graphical user interface element 1302 and/or any suitable substitute for inputting information within the computing arts, may be disabled if the set of preconditions has not been satisfied. Thus, in various examples, graphical user interface element 1302 may be displayed in a "grayed out" manner such that, although the user can read a dimmer or grayer version of the "Start" text, attempting to toggle or select graphical user interface element 1302 may not result in any corresponding functionality. In other words, when not enabled, graphical user interface element 1302 may simply correspond to essentially frozen pixels that remain the same regardless of whether the user attempts to toggle them or not. Those having skill in the art will readily understand that any other suitable mechanism for disabling an input mechanism or graphical user interface button may be used to achieve essentially the same purpose of preventing the user from beginning a specific test procedure prior to the preconditions all being satisfied. Moreover, as soon as the preconditions are satisfied, perhaps after one or more stages of performing a series of remedial actions (see FIG. 4), graphical user interface element 1302 may be enabled such that the user can successfully toggle it to trigger the initiation of specific testing procedures.

As further discussed above, in some scenarios, even after performing a series of remedial actions (see the three remedial actions of FIG. 4), the set of preconditions may nevertheless remain unsatisfied. In that scenario, the computing device executing the cellular field testing tool may issue an alert to the user. In some related methodologies, there may be no such alert and/or the alert may be inconspicuous. Accordingly, this disclosure envisions alerts that are both conspicuous and audiovisual in nature such that the user receives both an audio alert as well as a visual alert, thereby clearly bringing this information to the attention of the user.

Figure 14:
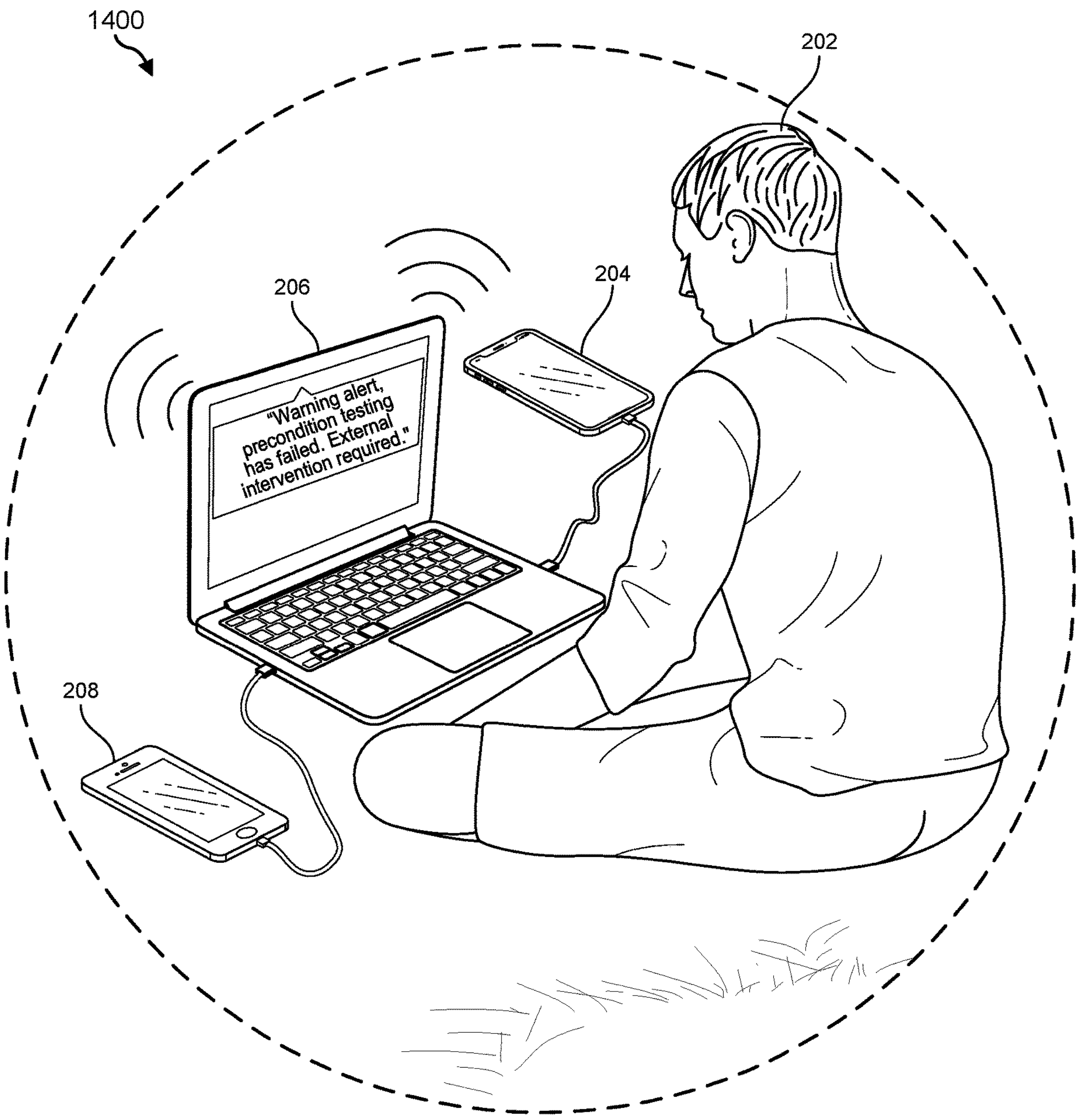
FIG. 14 shows a magnified view of the user operating the cellular field testing automation tool.

FIG. 14 shows a diagram 1400 of a magnified view of user 202 operating laptop 206 in connection with smartphone 204 and smartphone 208. As shown in this diagram, the visual alert may indicate to the user "Warning alert, precondition testing has failed. External intervention required." Those having skill in the art will readily ascertain that the particular text of this specific alert is merely an example for illustrative purposes and, in other examples, different variations and/or substitutes of such warnings may be used appropriately to notify the user.

The above discussion of FIGS. 2-14 provides background contextual information regarding radiofrequency drive testing for the following discussion of method 100 and related FIGS. 15-26. As first discussed above, method 100 may begin at step 101. At step 102, method 100 may As first discussed above, method 100A may begin at step 101A. At step 102A, method 100A may include initiating a cellular field testing tool that tests, during a test case, a condition of cellular network connectivity to both a device under test and a reference device. At step 104A, method 100A may include comparing, by the cellular field testing tool, how well the device under test performs with how well the reference device performs. At step 106A, method 100A may include determining, by the cellular field testing tool, a theoretical throughput level corresponding to an expected value of a network connection between the device under test or the reference device and a cellular base station. As step 108A, method 100A may include displaying, by the cellular field testing tool, a color-coded graphical representation of a category indicating how well the device under test or the reference device performs in comparison to the theoretical throughput level such that the displaying enables a user to detect whether a problem exists with the network connection to the device under test or the reference device. At step 110A, method 100A may conclude.

As used herein, the term "theoretical throughput level" can generally refer to a level of bandwidth, data rate, or connection resources or abilities, which is calculated, predicted, or expected of a network connection as distinct from how well the network connection or associated server may actually be performing at a particular point in time. As used herein, the term "color-coded graphical representation" can generally refer to any graphical representation that uses different colors to distinguish between different categories or responses indicating how well a mobile device, such as a device under test or a reference device, is performing in comparison to expectations, as discussed further below and consistent with the figures.

Figure 15:
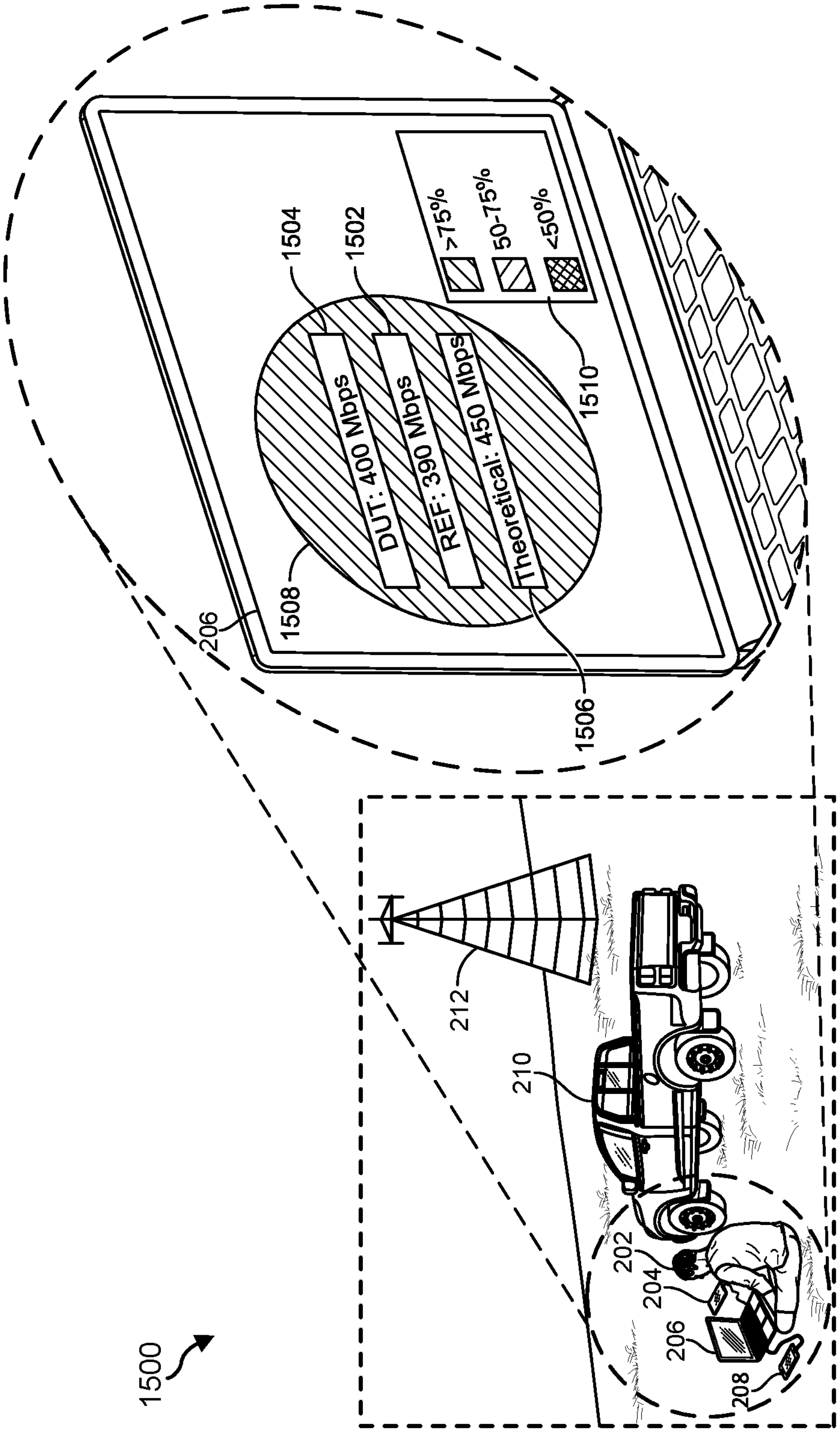
FIG. 15 shows a zoomed in diagram of a laptop display illustrating how a cellular field testing tool may display a color-coded graphical representation of a category that categorizes how much the throughput of an actual device rises to, or corresponds to, a determination of theoretical throughput.
Figure 16:
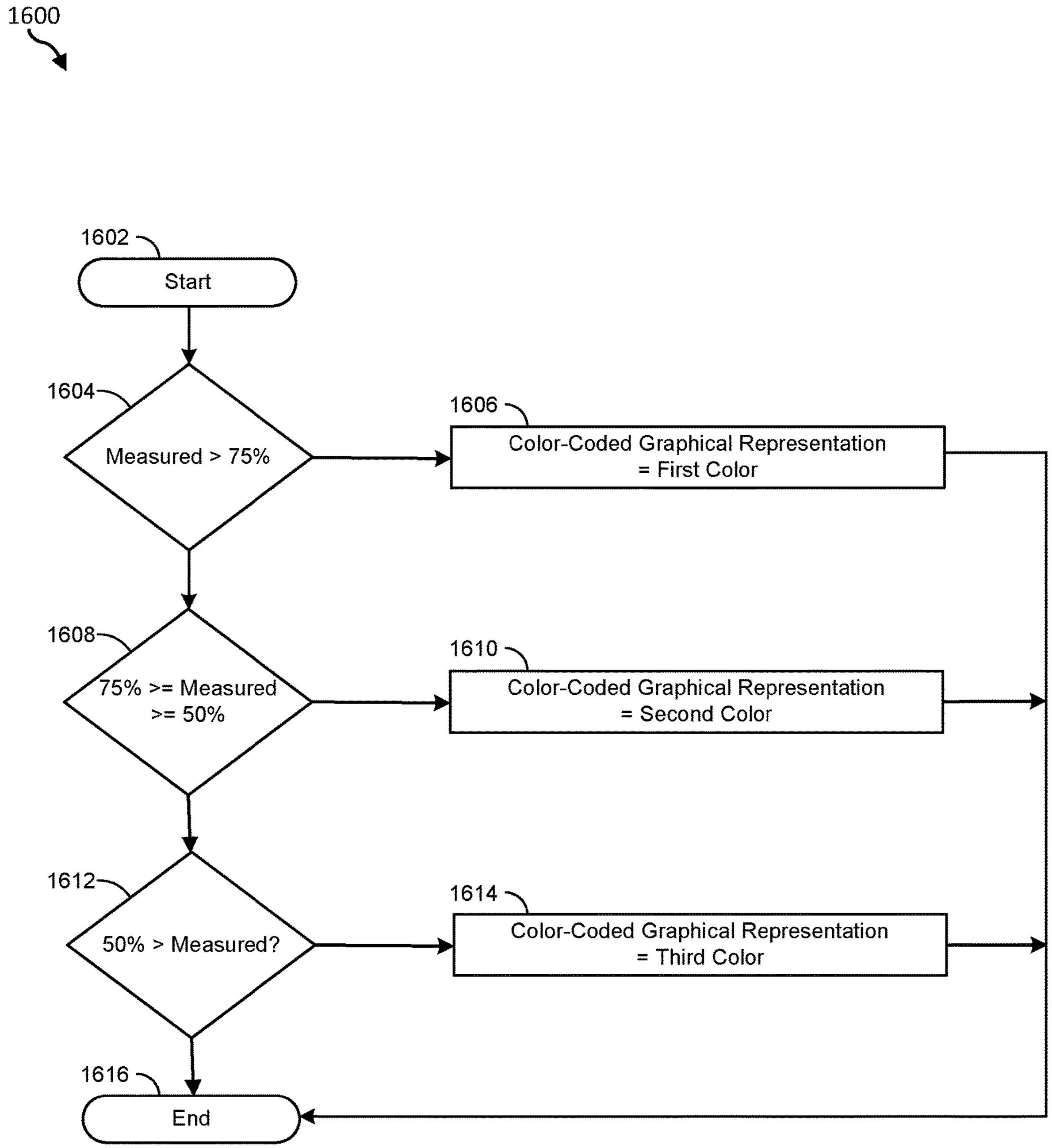
FIG. 16 shows a flow diagram for an example method corresponding to FIG. 15.

FIG. 15 shows a diagram 1500 that zooms in on a portion of laptop 206, thereby helping to illustrate, in one example, how performing method 100A may provide benefits to an end-user, as shown. In particular, the display of laptop 206 displays a color-coded graphical representation 1508, which also further includes a text indicator 1502, a text indicator 1504, and a text indicator 1506. In the example of this figure, color-coded graphical representation 1508 and the text indicators may be overlapping. Additionally, or alternatively, in other examples color-coded graphical representation 1508 and one or more of the text indicators may not be overlapping or may be displayed in sequence, for example. For convenience, the display also shows a legend 1510. Legend 1510 indicates how different colors, as candidates for the color of color-coded graphical representation 1508, indicate different levels according to which a particular device's throughput matches theoretical throughput, as identified by text indicator 1506. In the particular example of this figure, the theoretical throughput may correspond to 450 Mb per second, as shown. Although this particular example may correspond to fourth-generation LTE technology, in other examples different types of radio access technology may be used and the various methods, systems, and computer readable media disclosed herein are not intended to be necessarily limited to LTE technology or any particular radio access technology. Text indicator 1502 further illustrates to the reader how a reference device, such as smartphone 204, for example, may be experiencing or reporting a throughput level of 390 Mb per second. Similarly, text indicator 1504 further illustrates to the reader how a device under test, such as smartphone 208, for example, may be experiencing or reporting a throughput level of 400 Mb per second.

In some examples, each one of the plurality of categories respectively corresponds to a different subrange within a plurality of subranges along which the percentage falls. Additionally, or alternatively, in these examples each one of the plurality of categories respectively corresponds to a different subrange within a plurality of subranges along which the percentage falls. In the example of diagram 1500, the plurality of categories may correspond to the three categories shown within legend 1510, as discussed in more detail below.

In some examples, the cellular field testing tool compares how well the device under test performs with the theoretical throughput level. Accordingly, the cellular field testing tool may determine or calculate a level of similarity, correspondence, proportionality, etc., between a device under test or the reference device and the theoretical throughput level. By way of illustrative example, the cellular field testing tool may determine or calculate a proportion or percentage of the theoretical throughput that is reached by another device, such as the device under test or the reference device (e.g., in a scenario where the throughput of the device under test of the reference device is the lower of the two numbers). Additionally, or alternatively, the cellular field testing tool may determine or calculate a proportion or percentage of the device under test or reference device throughput that is reached by the determine theoretical throughput (e.g., in a scenario where the theoretical throughput is the lower of the two numbers).

In some examples, the cellular field testing tool compares how well the device under test performs with the theoretical throughput level by dividing a numerical measurement of how well the device under test performs by the theoretical throughput level as a percentage. In the illustrative example of FIG. 15, the throughput of the device under test is 400 Mb per second, the throughput of the reference device is 390 Mb per second, and the theoretical throughput is 450 Mb per second. Accordingly, dividing the throughput of the device under test by the theoretical throughput results in in a value of 89%. This value is greater than 75%, and accordingly the color of color-coded graphical representation 1508 matches the category of "greater than 75%" as further indicated by legend 1510, and as shown within diagram 1500. Similarly, dividing the throughput of the reference device by the theoretical throughput results in a value of 86%, which also corresponds to the same color. In the example of this figure, the cellular field testing tool may be configured to match the color of color-coded graphical representation 1508 based on the performance of the device under test with respect to the theoretical throughput. In this particular example, the color would be the same regardless of whether the performance of the device under test or the performance of the reference device is used for comparison purposes. Additionally, or alternatively, if the cellular field testing tool is configured to match the color of color-coded graphical representation 1508 based on the performance of the reference device, and if the reference device performed significantly more poorly, then the color of color-coded graphical representation 1508 may match instead the color for the "50 to 75%" category or the "less than 50%" category, as indicated by legend 1510, and as understood by those having skill in the art when reviewing diagram 1500.

In the example of this figure, three separate categories are identified using two different thresholds along the spectrum from 0 to 100%. Nevertheless, as understood by those having skill in the art, the technology of this application is not necessarily limited to that particular number of categories or to those particular thresholds. Rather, the overall inventive concept can correspond, in various examples, to measuring how well the device performs in comparison to theoretical expectations and then simplifying the process of alerting the user to this information by using a color-coded graphical representation matching a particular category, as further discussed above.

In some example, the color-coded graphical representation of the category associates a first color with a higher degree of how well the device under test performs with the theoretical throughput level than a distinct color-coded graphical representation of a distinct category associated with a second color. In some examples, the first color can include a color that is more closely associated with green (e.g., life) or blue (e.g., sky) than a second color. Similarly, the second color can refer to a color that is more closely associated with red (e.g., stop or blood) than another color.

Additionally, or alternatively, in some examples, the first color corresponds to green. For example, the various colors may correspond to the various colors of a traffic stop light or racetrack colored indicator. In such examples, the color of method 100A may belong to a plurality of at least three categories, and the cellular field testing tool the cellular field testing tool may associate the at least three categories with colors of green, yellow, and red, respectively. Accordingly, in the example of diagram 1500, the three colors of legend 1510 may correspond to green, yellow, and red, with the color of green indicating the highest level of performance or correspondence with theoretical throughput, as shown.

In some examples, the cellular field testing tool outputs an indication that an apparent deficiency in performance by the device under test can be due to the problem existing with the network connection rather than due to the device under test itself. In the example of diagram 1500, if the proportion of the throughput for the device under test was less than 50% of the theoretical throughput, then color-coded graphical representation 1508 may receive the third color category from legend 1510, which can correspond to red, as further discussed above, thereby indicating to a user that one or more deficiencies detected during performance testing may be due to the network connection not achieving theoretical expectations, which can suggest the potentiality of a server-side problem rather than a client-side problem with the device under test itself. Accordingly, with this information the user or administrator may perform one or more appropriate remedial actions, including investigating whether deficiencies are resulting from client-side or server-side problems or other problems with the configuration of the network connection.

Figure 17:
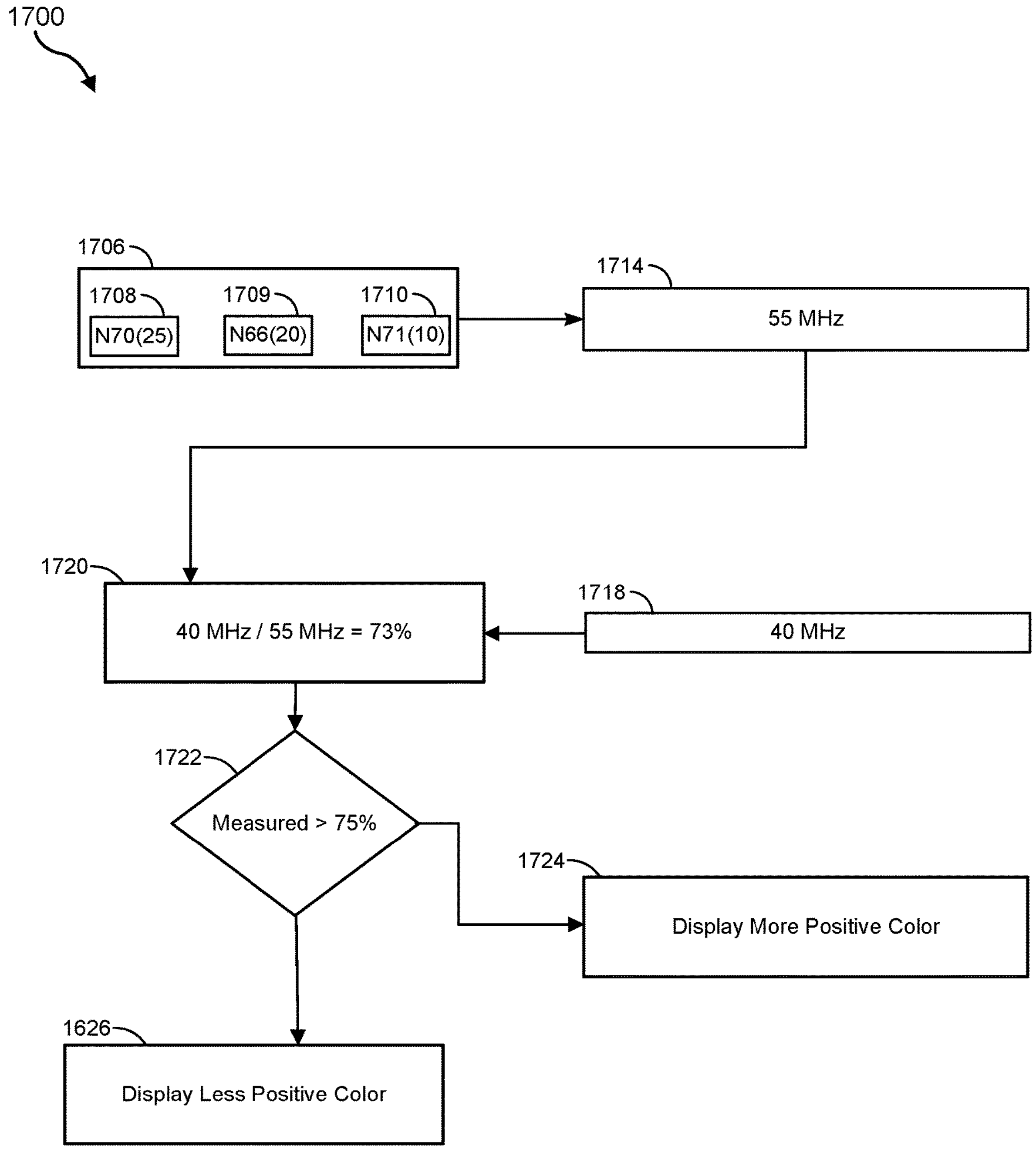
FIG. 17 shows a simplified diagram indicating how theoretical throughput may be calculated based on a particular network band and bandwidth combination.

FIG. 17 shows a workflow diagram 1700 that helps to further illustrate how theoretical throughput may be calculated, in a simplified manner, for a particular radiofrequency band and bandwidth combination. As further shown in this figure, a particular band and bandwidth combination 1706, which can be configured according to carrier aggregation, may include a component carrier 1708, a component carrier 1709, and a component carrier 1710. Each respective one of the multiple component carriers may specify a particular band, such as n70, n66, and n71, as well as a download bandwidth, such as 25 Mb per second, 20 Mb per second, or 10 Mb per second. In this example, these respective measurements of bandwidth may correspond to download bandwidth, but in other examples upload bandwidth may be used additionally or alternatively. Step 1714 of workflow diagram 1700 indicates that a total download bandwidth for band and bandwidth combination 1706 may correspond to 55 MHz, as shown. Similarly, step 1718 indicates that a measurement of actual bandwidth over a device under test or a reference device may correspond to 40 MHz. Accordingly, using the methodology outlined above in connection with FIG. 16, dividing measured throughput of 40 MHz by the theoretical throughput of 55 MHz may result in a value of 73%, which is less than the threshold level of 75%, thereby leading workflow diagram 1700 to proceed to step 1626, at which point a second color may be displayed. Alternatively, if the percentage had been greater than 75% at decision step 1722, then workflow diagram 1700 may proceed to step 1724, at which point a first color may be displayed, as further described above. Moreover, although the example of this figure uses megahertz as a measurement of capacity, bandwidth, data rate, and/or resources, those having skill in the art can ascertain that, in additional or alternative examples, other metrics such as megabits per second may be used as appropriate.

In the example of FIG. 17, the theoretical data throughput may be calculating or determined based on the amount of throughput per resource block. In such examples, the calculated theoretical data throughput may correspond to 0.87 Mb per second per resource block. This simplified calculation may be distinguished from calculating theoretical data throughput based on a resource element, data scheduling, and/or overhead, as understood by those having skill in the art.

Returning to FIGS. 1A-1C, method 100B may include initiating a cellular field testing tool that tests a condition of cellular network connectivity of a device under test. At step 104B, method 100B may include activating, in response to detecting that the cellular field testing tool is executing a performance test for a device under test while the device under test is moving in a vehicle, a trigger that outputs an audible alarm in response to the testing concluding. At step 106B, method 100B may include detecting, by the cellular field testing tool, that the testing has concluded. At step 108B, method 100B may include outputting, by the cellular field testing tool, the audible alarm in response to the testing concluding such that a driver of the vehicle is alerted to stop driving. At step 110B, method 100B may conclude.

Figure 18:
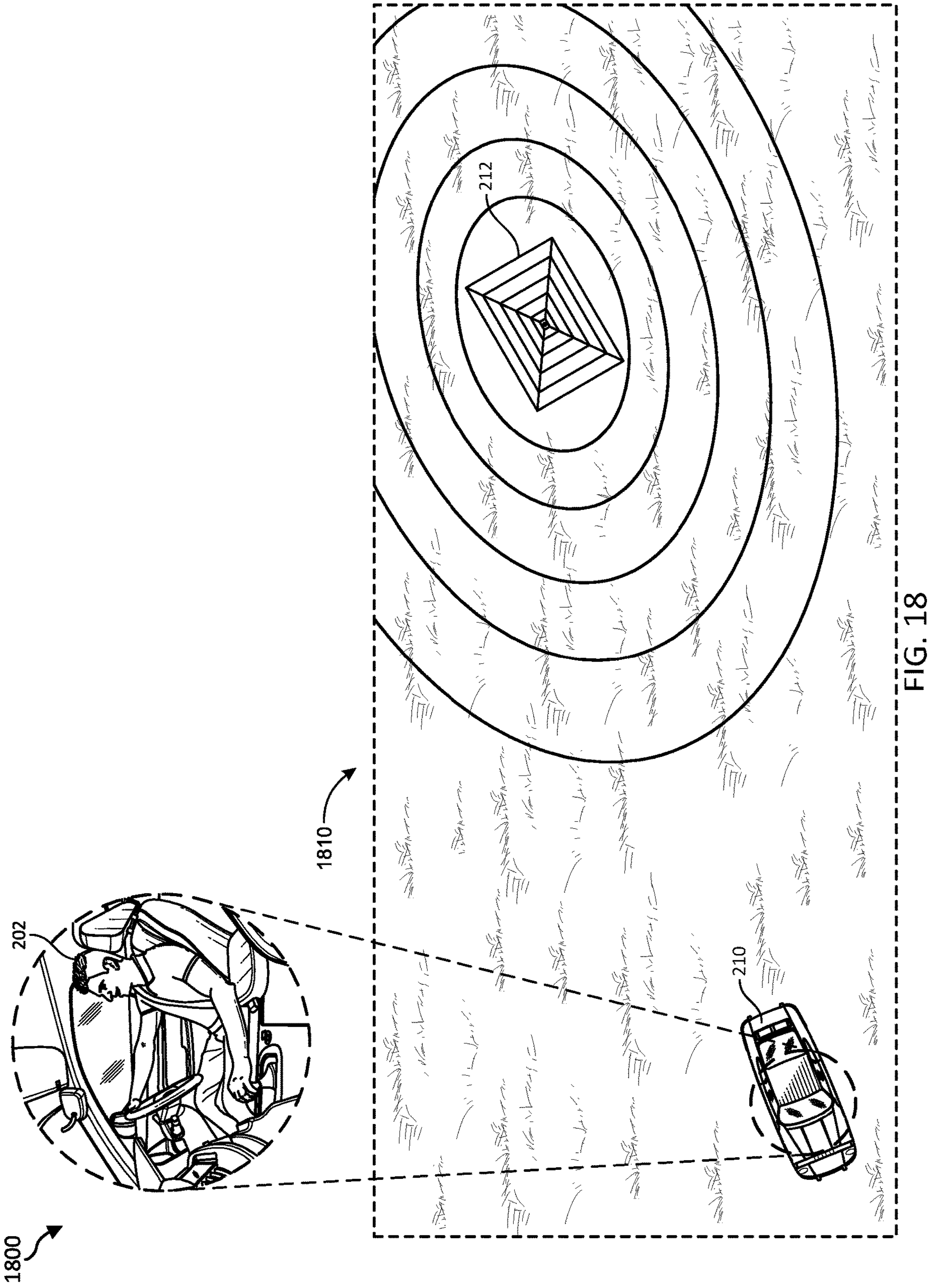
FIG. 18 shows a diagram indicating how an operator of a cellular field testing tool may see the cellular field testing tool disconnect when too far away from a cellular base station.

Method 100B may relate to audible and visible conclusion alarms that facilitate the alerting of a driver when performing mobility testing in which the performance of a mobile device is evaluated while the mobile device is actually mobile, such as when the mobile device is actually mobile within a vehicle driving along a path. FIG. 18 shows a diagram 1800 that helps to illustrate how user 202 might operate laptop 206 outside of a range of a cellular base station 212. In particular, user 202 and laptop 206 may be located outside of the range indicated by a farthest band of signal bands 1810 emanating from cellular base station 212, such that laptop 206 can no longer reach or establish a meaningful network connection with cellular base station 212.

Figure 19:
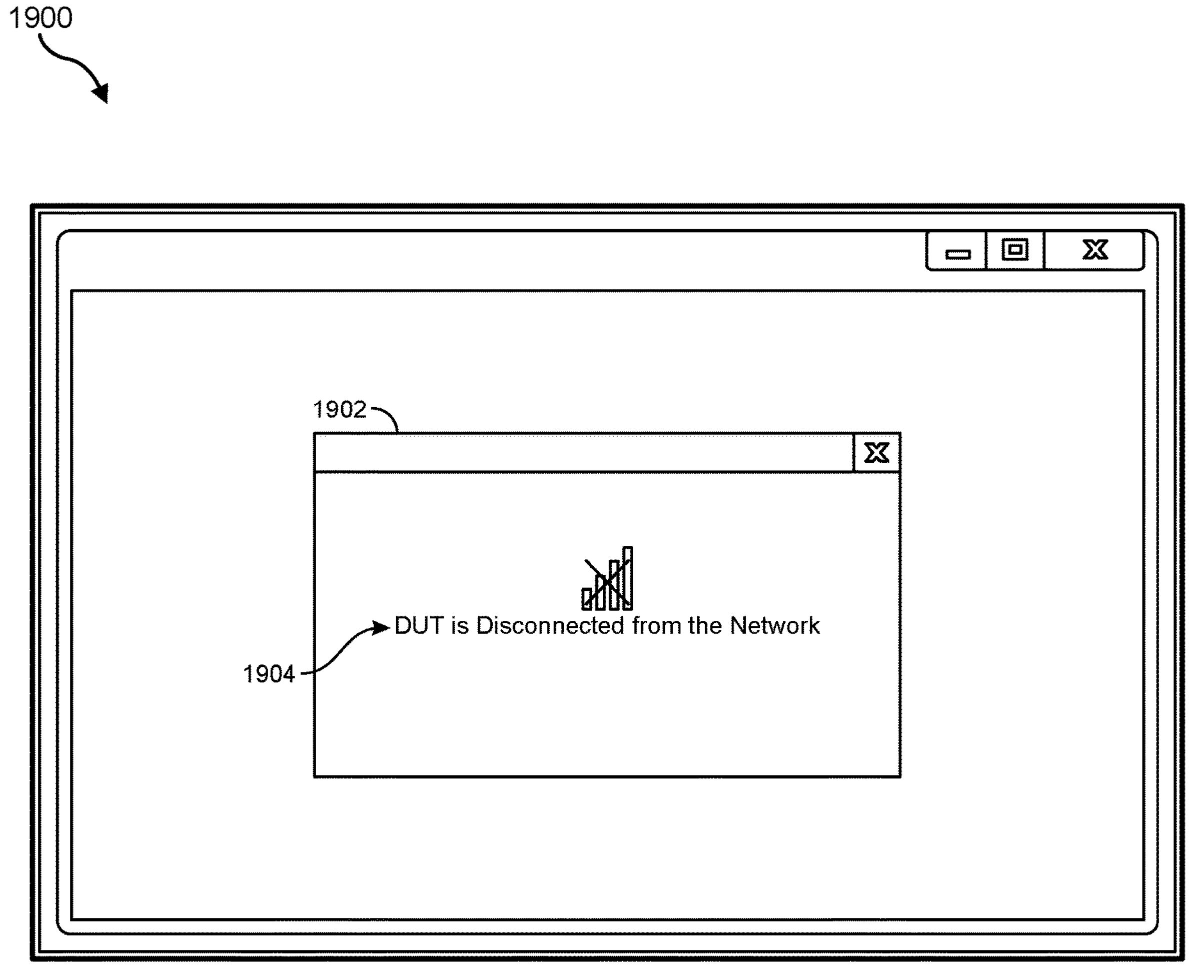
FIG. 19 shows a diagram for a graphical user interface that includes an alert to a user indicating that the device under test has disconnected from a corresponding network.

The scenario of diagram 1800 may correspond to essentially the only scenario that might trigger a visual alarm within the related cellular field testing tool. FIG. 19 shows a diagram 1900 of an example of such a visual alarm, including a pop-up notification 1902, as well as an item of notification text 1904. Item of notification text 1904 may specify to the reader that the device under test is disconnected from the network, as shown. The device under test, such as laptop 206, may be disconnected from a network due to the fact that user 202 is located too far away from cellular base station 212, as discussed above in connection with FIG. 18. The failure to provide any other visible alarms to the user within the related cellular field testing tool may correspond to a deficiency upon which the technology of this application can improve. In addition to this failure or deficiency, the related cellular field testing tool may not offer any audible alarms whatsoever (as distinct from visible alarms), which again the technology of this application can improve upon, as discussed in more detail below.

Figure 20:
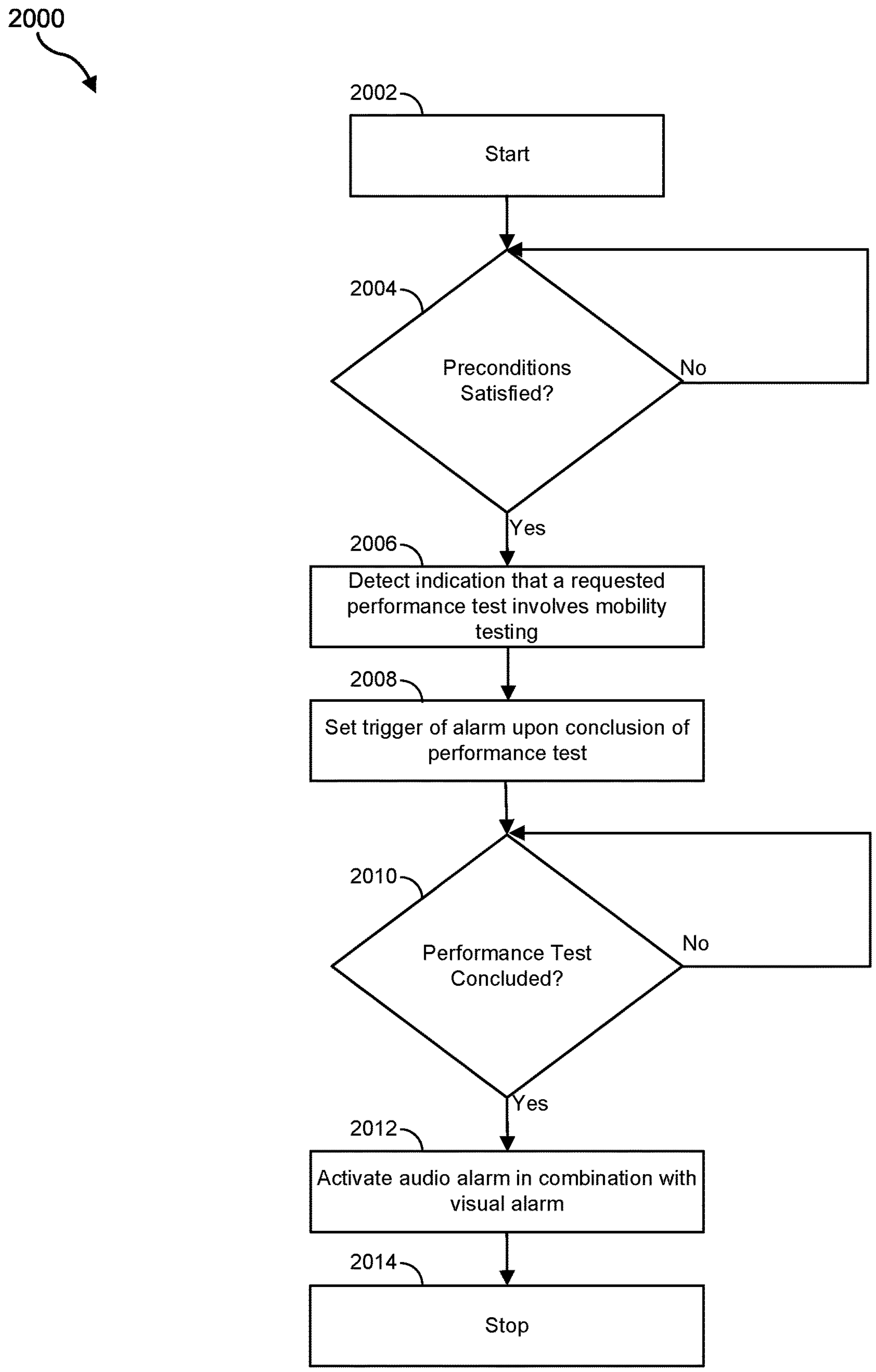
FIG. 20 shows a flow diagram for an example method relating to audible and visible conclusion alarms.

In contrast, FIG. 20 shows a flow diagram for a method 2000 that can be performed to address one or more of the deficiencies outlined above, in addition to method 100B or in the alternative to method 100B. At step 2002, method 2000 may begin. At a decision step 2004, method 2004 may include checking whether one or more preconditions have been satisfied, including conditions regarding being located within certain specified longitudinal and/or latitudinal coordinates, as discussed above in connection with FIGS. 2-14. If the decision is no at decision step 2004, then method 2000 may wait in a holding pattern, as shown. Alternatively, if the decision is yes at decision step 2004, then method 2000 may proceed to step 2006, at which point method 2000 may include detecting an indication that a requested performance test involves mobility testing.

Step 2006 may be performed in a variety of ways. In some examples, the particular performance test may involve mobility or vehicle movement inherently, and accordingly the particular performance test may be hardcoded or preprogrammed with this classification. Additionally, or alternatively, in some examples, the cellular field testing tool may detect movement and infer that the movement is associated with the performance test. Similarly, in some examples, the cellular field testing tool may receive an explicit or other indication as input from a user to notify the cellular field testing tool that the corresponding performance test involves mobility and/or that mobility conclusion alarms should be utilized, as discussed in more detail below.

In response to detecting the indication at step 2006, method 2000 may furthermore proceed to step 2008, at which point a trigger may be set for activating an alarm upon conclusion of the performance test. In other words, although the alarm may not be sounding at the current time, the alarm may be set or configured to sound upon the conclusion of the performance test.

From step 2008, method 2000 may proceed to decision step 2010, at which point the cellular field testing tool may begin a process of monitoring to ascertain, or otherwise detect, when the performance test has concluded. If the decision is no at decision step 2010, then method 2000 may proceed to enter a corresponding holding pattern, as shown. Alternatively, if the decision is yes at decision step 2010, then method 2000 may proceed to step 2012, at which point the actual audio alarm may be activated to sound. Additionally, or alternatively, a visual alarm may also be activated, thereby creating a more conspicuous audiovisual alarm. At step 2014, method 2000 may conclude.

Figure 21:
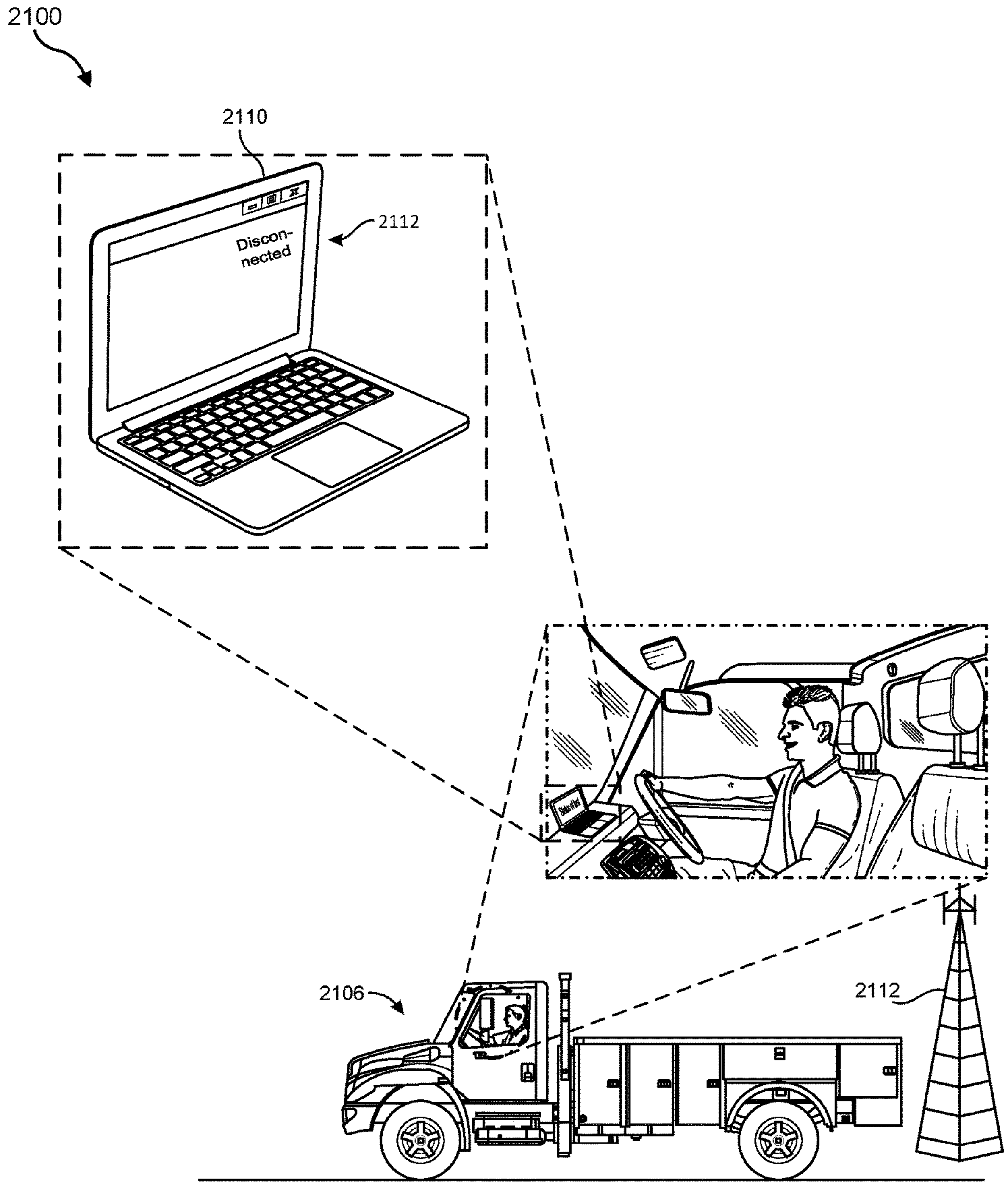
FIG. 21 shows a diagram indicating a deficiency that may be improved by one or more of the example methods relating to audible and visible conclusion alarms.
Figure 22:
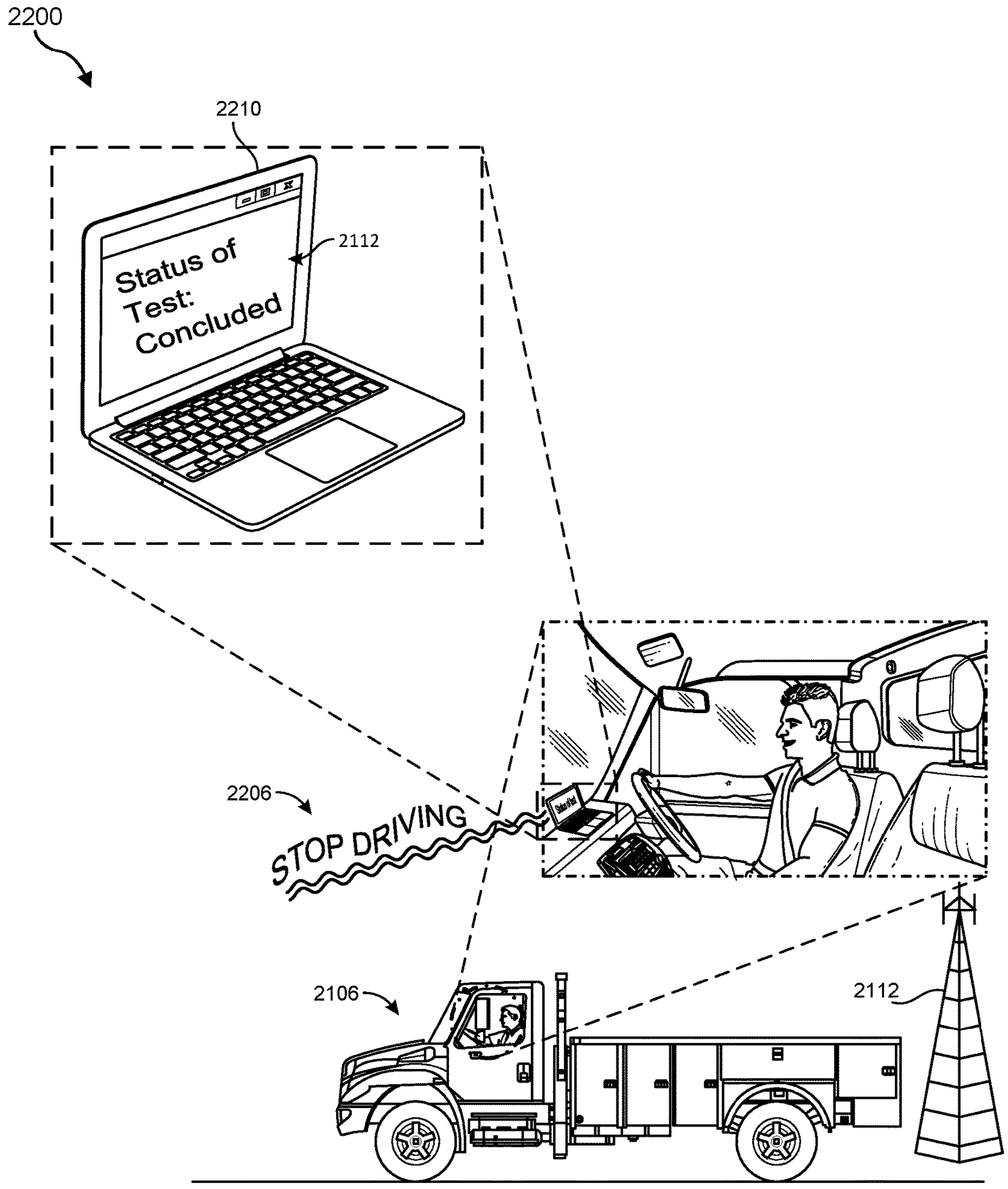
FIG. 22 shows a diagram indicating improvement associated with one or more of the example methods relating to audible and visible conclusion alarms.

FIGS. 21-22 show a diagram 2100 and a diagram 2200 that further help illustrate the improvement corresponding to method 100B and method 2000, for example. Diagram 2100 shows a related methodology that may increase the difficulty of a user 2002 ascertaining when the performance test has concluded such that the user may appropriately stop driving. As shown within diagram 2100, a laptop 2110 corresponding to laptop 206 may include an inconspicuous indicator 2112 that the network connection has become disconnected. This may occur when a truck 2106 drives beyond the range of a cellular base station 2112. The actual performance test, which may have been conducted as part of mobility testing, may have concluded long ago and prior to the laptop becoming disconnected from cellular base station 2112. As discussed above, laptop 2110 may provide neither a visible nor an audio alarm upon the conclusion of the performance test, as distinct from a visual alert that the network connection has been lost, which can occur much later in time. Furthermore, diagram 2100 illustrates how inconspicuous indicator 2112 is significantly or substantially small or inconspicuous in size, which further creates challenges for the driver when driving and focusing upon the road in front of the vehicle.

In contrast, diagram 2200 of FIG. 22 shows an improvement upon the methodology of diagram 2100 and corresponding to method 100B and method 2000, as further discussed above. In contrast to the methodology of diagram 2100, the visible alert 2112 in FIG. 22 is now much larger and more conspicuous. Any variation or utilization of font size, animation, color, etc., can be leveraged to increase the conspicuousness of indicator 2112 (e.g., taking up substantially the entire screen, three quarters of the screen, half of the screen, etc.). Additionally, rather than indicating that the network connection has been lost, which might only occur much later in time after the vehicle 2106 drives too far past cellular base station 2112, indicator 2112 in diagram 2200 reports the status of the performance test, and can report the status continuously or can update the status when the performance test actually concludes, as shown.

Moreover, diagram 2200 also illustrates how an audible indicator 2206 may also be activated to increase the conspicuousness or power of the alert to the driver upon the conclusion of the performance test. As discussed above, the performance test may conclude while laptop 2210 is still connected to cellular base station 2112. In this particular example, the audible alert includes a verbal message "stop driving," but in other examples a different textual message or no text within the message may be utilized, additionally or alternatively, as distinct from a horn or other alert sound. Upon hearing the audiovisual alert, the driver of vehicle 2106 and/or the operator of laptop 2210 may beneficially slow vehicle 2106 to a stop rather than proceeding with wasted movement now that the performance test has concluded.

Returning to FIGS. 1A-1C, in FIG. 1C at step 102C, method 100C may include initiating a cellular field testing tool that tests a condition of cellular network connectivity of a device under test. At step 104C, method 100C may include detecting, by the cellular field testing tool, that a network interruption has occurred for a specified period of time. At step 106C, method 100C may include determining, by the cellular field testing tool, a proportion, during which the network interruption occurred, of an entire data session conducted as a performance test. At step 108C, method 100C may include outputting, by the cellular field testing tool, an indication of the proportion of the entire data session during which the network interruption occurred such that a user is enabled to track how reliable a data connection is during a performance test of the device under test. At step 110C, method 100C may conclude.

Method 100C and the discussion of FIGS. 23-26 help to solve one or more deficiencies associated with related methodologies and related cellular field testing tools, as discussed further below. In such related methodologies, no logic might exist to determine whether a data stall has occurred within the cellular field testing tool. In these scenarios, the cellular field testing tool may simply report that no data was detected or that it was unable to reach a particular server at a particular time. The server may correspond to an iPerf server or a ping server, as discussed further below. Accordingly, the related cellular field testing tools may essentially have no regard or understanding, in terms of recorded memory or logs, of what previously or subsequently occurred in detail during the test scenario (i.e., beyond reporting that no data was detected).

Figure 23:
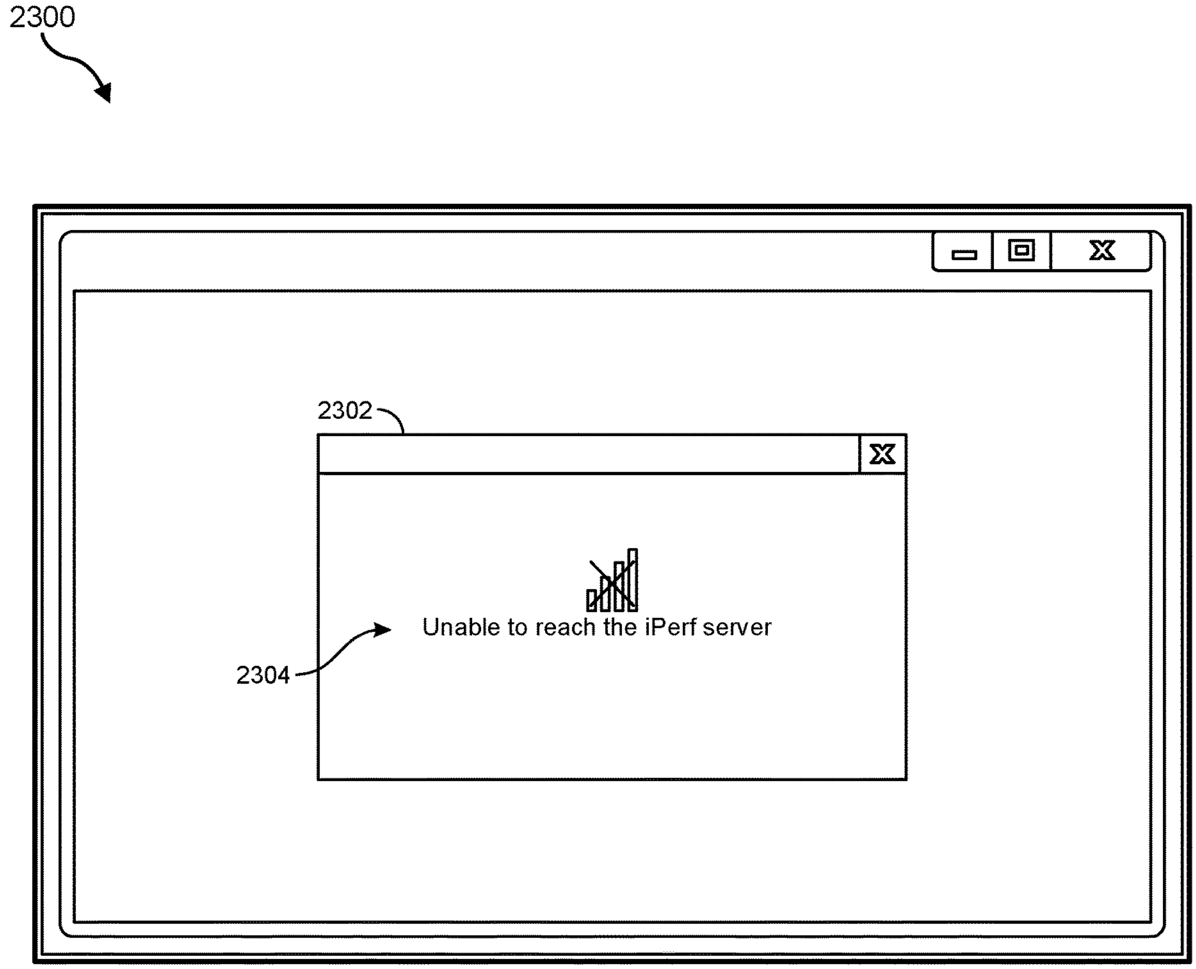
FIG. 23 shows a diagram for a graphical user interface that includes an alert to a user indicating that mobile device is unable to reach one or more servers.

FIG. 23 shows a diagram 2300 of a graphical user interface that helps to illustrate to the reader the scenario in which method 100C may be beneficially used. As further shown within diagram 2300, the graphical user interface may include a pop-up notification 2302, which may further include a text indicator 2304. Text indicator 2304 may specify to the user that the cellular field testing tool is "unable to reach the iPerf server." iPerf may correspond to just one illustrative example of a network performance tool executing at a server, such that the cellular field testing tool has detected a failure to reach that tool. Additionally, or alternatively, in other examples the text indicator 2304 may indicate to the user that the cellular field testing tool was unable to reach a ping server, as one illustrative example of a network reachability tool.

Figure 24:
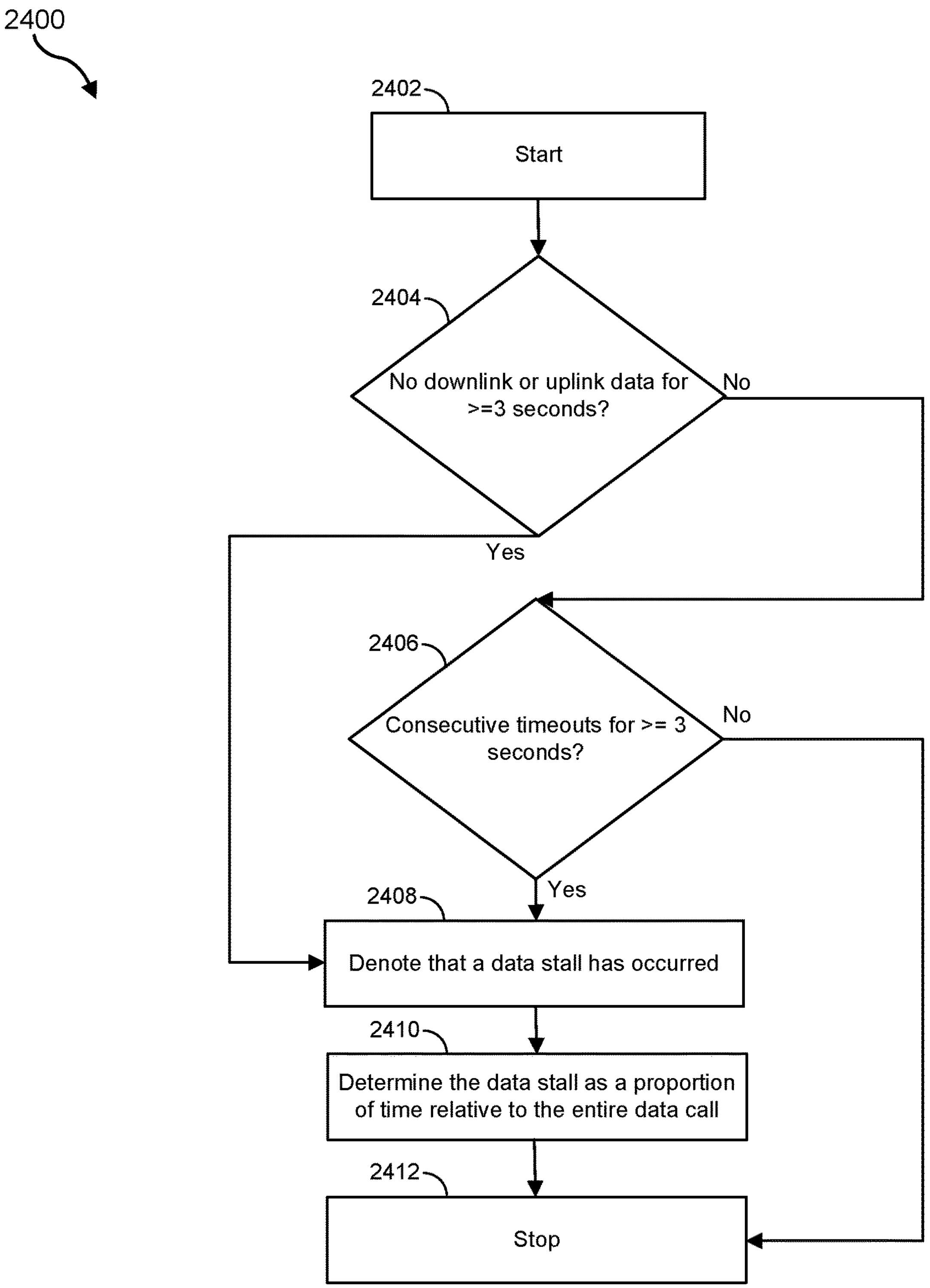
FIG. 24 shows a flow diagram for an example method relating to data stalls.

FIG. 24 shows a flow diagram 2400 for an example method that may improve upon one or more of the deficiencies outlined above, in addition to or in the alternative to method 100C. At step 2402, method 2400 may begin. Subsequently, at decision step 2404, the cellular field testing tool may check whether a period of at least three seconds has occurred during which neither downlink nor uplink data was received. If the answer is no at decision step 2404, then method 2400 may proceed to another decision step 2406, at which point the cellular field testing tool may check whether consecutive timeouts have occurred for at least three seconds. A decision of yes at either decision step 2404 or decision step 2406 may indicate to the user that a data stall has occurred. Accordingly, method 2400 may proceed to step 2408, at which point the cellular field testing tool may denote that the data stall has occurred. Similarly, at step 2410, the cellular field testing tool may determine the amount of the data stall as a proportion of time relative to the entire data session corresponding to the performance test. Lastly, at step 2412, method 2400 may conclude. Moreover, if the decision is no at both decision step 2404 and decision step 2406, then no data stall may have been detected and method 2400 may proceed directly to step 2412 such that method 2400 concludes. As used herein, the term "data session" can refer to a telephone call, a data (e.g., Internet and/or cellular data) connection, and/or any other session of establishing and then concluding a network connection, even if the data session does not necessarily carry a voice conversation.

Those having skill in the art will ascertain that decision steps 2404 and 2406 are performed in a particular order in the example of this figure, but may be performed in the alternative order, or in parallel, in additional or alternative examples. Similarly, those having skill will understand that the particular period of time used for decision step 2404 and decision step 2406 are the same in this example but may be different in other examples. Moreover, those having skill will understand that a particular threshold of three seconds was used at decision step 2404 and decision step 2406 in this example, and yet in other examples one or more different thresholds may be used in a manner that nevertheless obtains the intended goals, improvements, and/or benefits of method 100C, as appropriate. For example, the specified period of time may correspond to a number of seconds less than 10 or may be specified as a particular number of seconds less than 10.

Figure 25:
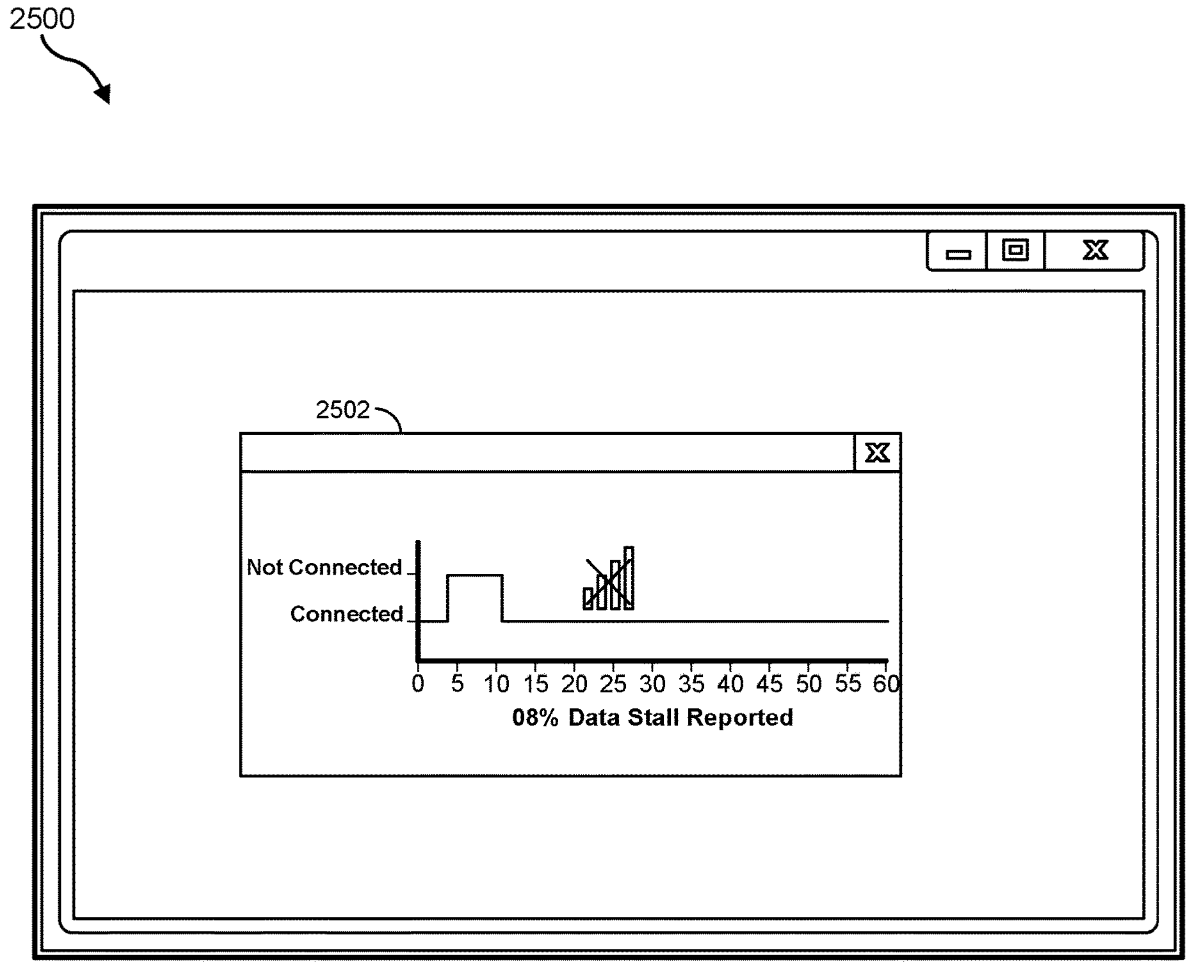
FIG. 25 shows a diagram for a graphical user interface that can be used in connection with the example method relating to data stalls.

FIG. 25 shows a diagram 2500 for a graphical user interface relating to the performance of method 2400, as discussed above. As shown within this figure, the graphical user interface may include a pop-up notification 2502, which may further display a chart or graph that indicates the percentage, from across the entire duration of a data session performed as part of a performance test, during which the network interruption was detected. In the particular example of this chart, the network interruption was detected from approximately minute five to approximately minute 10, thereby resulting in a graphical report to the user of an 8% ($5/60$) data stall, as shown. Moreover, the pop-up notification 2502 further shows to the user not just the reported percentage but also the specific location of the data stall during the overall length of the entire data session.

Figure 26:
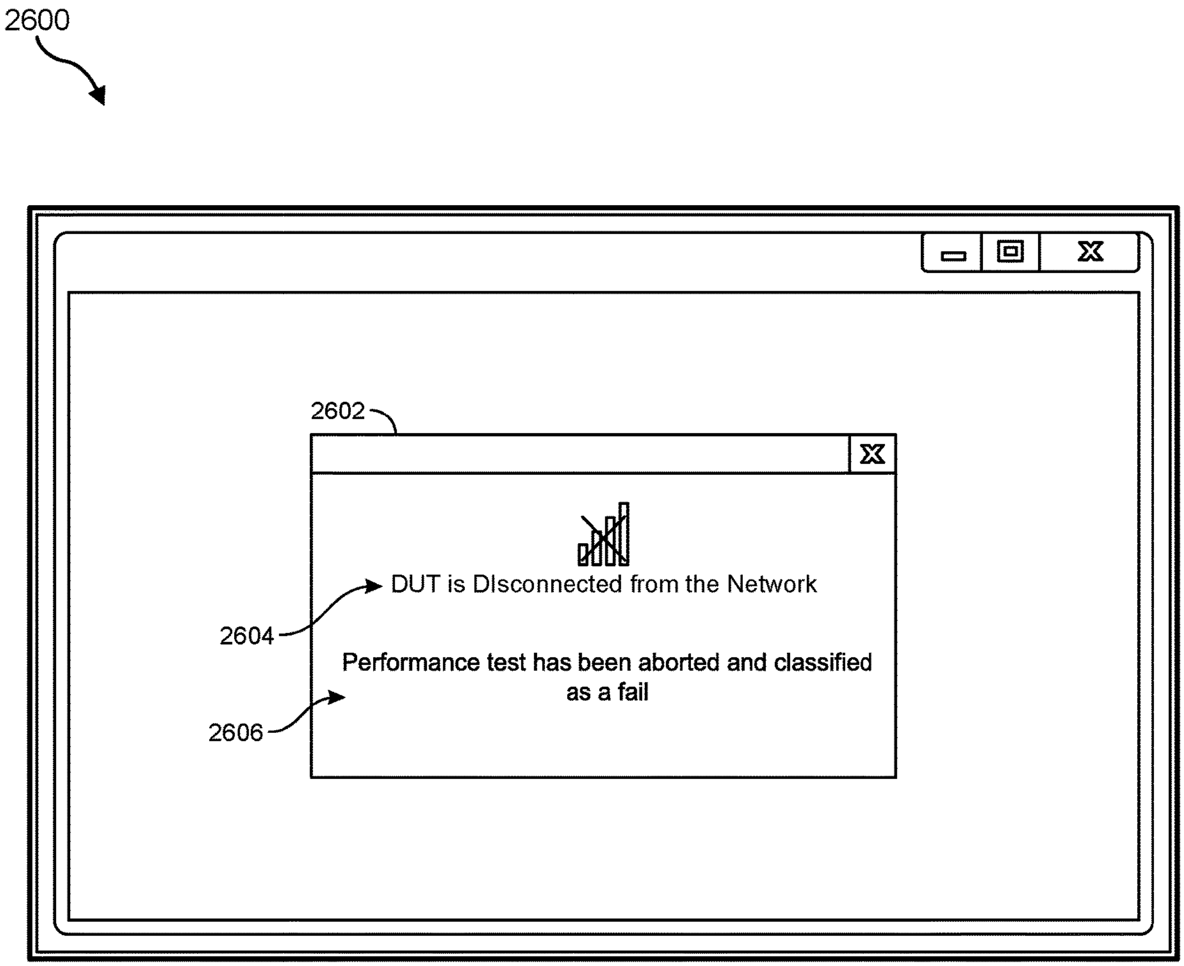
FIG. 26 shows another diagram for a graphical user interface that can be used in connection with the example method relating to data stalls or data drops.

Additionally, or alternatively, this application also discloses that a data drop, as distinct from a data stall, may be reported to the user when detected. In particular, FIG. 26 shows a diagram 2600 for a graphical user interface including a pop-up notification 2602 with a text indicator 2604 and a text indicator 2606. Text indicator 2604 indicates to the user that the device under test has been disconnected from the network. Similarly, text indicator 2606 indicates that the performance test has been aborted and classified as a failure. This can occur when there is no downlink or uplink traffic between the device under test and the network for a specified period of time, such as 10 seconds, without connectivity being restored. In such scenarios, the data drop can be due to loss of connectivity with a user plane function, loss of service with the network in a degrading radio frequency environment, and/or some other unspecified network issue that may be causing an item of user equipment to deregister or lose data connectivity.

Figure 27:
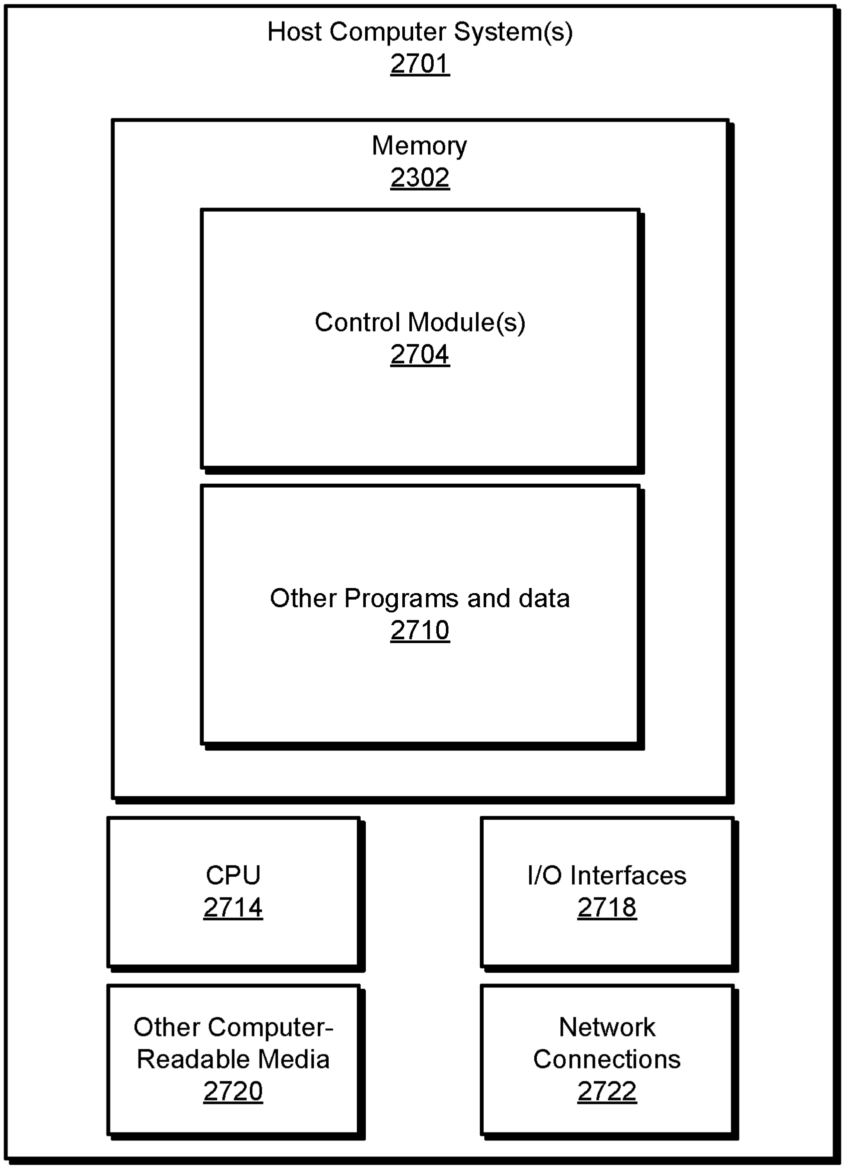
FIG. 27 shows a diagram of an example computing system that may facilitate the performance of one or more of the methods described herein.

FIG. 27 shows a system diagram that describes an example implementation of a computing system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 27 illustrates an example of underlying hardware on which such software and functionality may be hosted and/or implemented.

In particular, shown is example host computer system(s) 2701. For example, such computer system(s) 2701 may execute a scripting application, or other software application, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 2701 may include memory 2702, one or more central processing units (CPUs) 2714, I/O interfaces 2718, other computer-readable media 2720, and network connections 2722.

Memory 2702 may include one or more various types of non-volatile and/or volatile storage technologies. Examples of memory 2702 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 2702 may be utilized to store information, including computer-readable instructions that are utilized by CPU 2714 to perform actions, including those of embodiments described herein.

Memory 2702 may have stored thereon control module(s) 2704. The control module(s) 2704 may be configured to implement and/or perform some or all of the functions of the systems or components described herein. Memory 2702 may also store other programs and data 2710, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 2722 are configured to communicate with other computing devices to facilitate the functionality described herein. In various embodiments, the network connections 2722 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 2718 may include a video interface, other data input or output interfaces, or the like. Other computer-readable media 2720 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

initiating a cellular field testing tool that tests, during a test case, a condition of cellular network connectivity to both a device under test and a reference device;

comparing, by the cellular field testing tool, how well the device under test performs with how well the reference device performs;

determining, by the cellular field testing tool, a theoretical throughput level corresponding to an expected value of a network connection between the device under test or the reference device and a cellular base station; and displaying, by the cellular field testing tool, a color-coded graphical representation of a category indicating how well the device under test or the reference device performs in comparison to the theoretical throughput level such that the displaying enables a user to detect whether a problem exists with the network connection to the device under test or the reference device;

wherein:

the cellular field testing tool outputs an indication that a deficiency in performance by the device under test is due to the problem existing with the network connection rather than due to the device under test itself at least in part by simultaneously displaying the theoretical throughput level, a first throughput level that is reported by the device under test and that is below the theoretical throughput level, and a second throughput level that is reported by the reference device and that is below the theoretical throughput level.

2. The method of claim 1, wherein the method further comprises outputting, by the cellular field testing tool, an indication of how the device under test performs in comparison to how well the reference device performs.

3. The method of claim 1, wherein the cellular field testing tool compares how well the device under test performs with the theoretical throughput level.

4. The method of claim 3, wherein the cellular field testing tool compares how well the device under test performs with the theoretical throughput level by dividing a numerical measurement of how well the device under test performs by the theoretical throughput level as a percentage.

5. The method of claim 4, wherein:

the color-coded graphical representation corresponds to the category as one category within a plurality of categories; and each one of the plurality of categories respectively corresponds to a different subrange within a plurality of subranges along which the percentage falls.

6. The method of claim 1, wherein the color-coded graphical representation of the category associates a first color with a higher degree of how well the device under test performs with the theoretical throughput level than a distinct color-coded graphical representation of a distinct category associated with a second color.

7. The method of claim 6, wherein the first color corresponds to green.

8. The method of claim 1, wherein:

the category belongs to a plurality of at least three categories; and the cellular field testing tool associates the at least three categories with colors of green, yellow, and red, respectively.

9. The method of claim 1, wherein the device under test comprises a smartphone.

10. The method of claim 1, wherein the cellular field testing tool operates on a laptop.

11. A non-transitory computer-readable storage medium having computer-executable instructions stored thereon which, when executed by at least one computer processor, cause operations to be performed, the operations including:

initiating a cellular field testing tool that tests, during a test case, a condition of cellular network connectivity to both a device under test and a reference device;

comparing, by the cellular field testing tool, how well the device under test performs with how well the reference device performs;

determining, by the cellular field testing tool, a theoretical throughput level corresponding to an expected value of a network connection between the device under test or the reference device and a cellular base station; and displaying, by the cellular field testing tool, a color-coded graphical representation of a category indicating how well the device under test or the reference device performs in comparison to the theoretical throughput level such that the displaying enables a user to detect whether a problem exists with the network connection to the device under test or the reference device;

wherein:

the cellular field testing tool outputs an indication that a deficiency in performance by the device under test is due to the problem existing with the network connection rather than due to the device under test itself at least in part by simultaneously displaying the theoretical throughput level, a first throughput level that is reported by the device under test and that is below the theoretical throughput level, and a second throughput level that is reported by the reference device and that is below the theoretical throughput level.

12. The non-transitory computer-readable storage medium of claim 11, wherein the operations further comprise outputting, by the cellular field testing tool, an indication of how the device under test performs in comparison to how well the reference device performs.

13. The non-transitory computer-readable storage medium of claim 11, wherein the cellular field testing tool compares how well the device under test performs with the theoretical throughput level.

14. The non-transitory computer-readable storage medium of claim 13, wherein the cellular field testing tool compares how well the device under test performs with the theoretical throughput level by dividing a numerical measurement of how well the device under test performs by the theoretical throughput level as a percentage.

15. The non-transitory computer-readable storage medium of claim 14, wherein:

the color-coded graphical representation corresponds to the category as one category within a plurality of categories; and each one of the plurality of categories respectively corresponds to a different subrange within a plurality of subranges along which the percentage falls.

16. The non-transitory computer-readable storage medium of claim 11, wherein the color-coded graphical representation of the category associates a first color with a higher degree of how well the device under test performs with the theoretical throughput level than a distinct color-coded graphical representation of a distinct category associated with a second color.

17. The non-transitory computer-readable storage medium of claim 16, wherein the first color corresponds to green.

18. The non-transitory computer-readable storage medium of claim 11, wherein:

the category belongs to a plurality of at least three categories; and the cellular field testing tool associates the at least three categories with colors of green, yellow, and red, respectively.

19. The non-transitory computer-readable storage medium of claim 11, wherein the device under test comprises a smartphone.

20. A system comprising:

at least one computer processor; and at least one memory coupled to the at least one computer processor, wherein the at least one memory has computer-executable instructions stored thereon which, when executed by the at least one computer processor, cause operations to be performed, the operations including:

initiating a cellular field testing tool that tests, during a test case, a condition of cellular network connectivity to both a device under test and a reference device;

comparing, by the cellular field testing tool, how well the device under test performs with how well the reference device performs;

determining, by the cellular field testing tool, a theoretical throughput level corresponding to an expected value of a network connection between the device under test or the reference device and a cellular base station; and displaying, by the cellular field testing tool, a color-coded graphical representation of a category indicating how well the device under test or the reference device performs in comparison to the theoretical throughput level such that the displaying enables a user to detect whether a problem exists with the network connection to the device under test or the reference device;

wherein:

the cellular field testing tool outputs an indication that a deficiency in performance by the device under test is due to the problem existing with the network connection rather than due to the device under test itself at least in part by simultaneously displaying the theoretical throughput level, a first throughput level that is reported by the device under test and that is below the theoretical throughput level, and a second throughput level that is reported by the reference device and that is below the theoretical throughput level.

* * * * *